US010318917B1

(12) United States Patent
Goldstein et al.

(10) Patent No.: US 10,318,917 B1
(45) Date of Patent: Jun. 11, 2019

(54) MULTIPLE SENSOR DATA FUSION SYSTEM

(71) Applicant: AMAZON TECHNOLOGIES, INC., Seattle, WA (US)

(72) Inventors: Michel Leonard Goldstein, Seattle, WA (US); Ramanathan Palaniappan, Issaquah, WA (US); Fan Sun, Seattle, WA (US); Liefeng Bo, Seattle, WA (US); Ohil Krishnamurthy Manyam, Bellevue, WA (US); Navid Shiee, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/675,167

(22) Filed: Mar. 31, 2015

(51) Int. Cl.
*G06Q 10/00* (2012.01)
*G06Q 10/08* (2012.01)
*G06K 7/14* (2006.01)
*G06Q 20/00* (2012.01)
*G06Q 20/20* (2012.01)

(52) U.S. Cl.
CPC .......... *G06Q 10/087* (2013.01); *G06Q 10/00* (2013.01); *G06K 7/14* (2013.01); *G06Q 20/00* (2013.01); *G06Q 20/20* (2013.01); *G06Q 20/208* (2013.01)

(58) Field of Classification Search
CPC ...... G06Q 20/00; G06Q 20/208; G06Q 20/20; G06Q 90/00; G06K 7/14; G06K 9/98; G06K 7/10861
USPC .......... 705/14.64, 23, 323; 235/375, 462.08; 702/150; 384/150; 382/100
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 2011/0011936 A1 | 1/2011 | Morandi et al. |
| 2012/0284132 A1 | 11/2012 | Kim et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Olusegun Goyea
(74) *Attorney, Agent, or Firm* — Lindauer Law, PLLC

(57) ABSTRACT

An inventory location such as a shelf may be used to stow different types of items. Interactions may take place, such as the pick or place of one or more items from the inventory location. Image data may be acquired from cameras viewing the shelf and weight data may be acquired from weight sensors coupled to the shelf. Hypotheses may be determined that indicate possible interactions with the inventory location, such as pick or place of an item with regard to the inventory location, and the probability that those interactions are correct. The hypotheses and their associated probabilities may be aggregated. From the aggregated hypotheses, a hypothesis with a highest confidence value may be deemed a solution.

21 Claims, 12 Drawing Sheets

(56) References Cited

U.S. PATENT DOCUMENTS

| | | | |
|---|---|---|---|
| 2013/0223673 A1* | 8/2013 | Davis | G06K 9/78 |
| | | | 382/100 |
| 2013/0284806 A1 | 10/2013 | Margalit | |
| 2013/0290106 A1* | 10/2013 | Bradley | G06Q 90/20 |
| | | | 705/14.64 |
| 2014/0052555 A1* | 2/2014 | MacIntosh | G06Q 20/208 |
| | | | 705/23 |
| 2014/0074762 A1* | 3/2014 | Campbell | G06Q 40/00 |
| | | | 706/46 |
| 2014/0379296 A1* | 12/2014 | Nathan | G06Q 10/08 |
| | | | 702/150 |
| 2015/0086107 A1 | 3/2015 | Dedeoglu et al. | |
| 2015/0310601 A1* | 10/2015 | Rodriguez | G06T 1/0007 |
| | | | 348/150 |

OTHER PUBLICATIONS

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate. net/publication/221568350_How_to_nudge_in_Situ_designing_ lambent_devices_to_deliver_salient_information_in_supermar- kets>.

Pop, Cristian, "Introduction to the BodyCom Technology", AN1391, DS01391A, Microchip Technology, Inc., May 2, 2011.

* cited by examiner

MULTIPLE SENSOR DATA FUSION SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
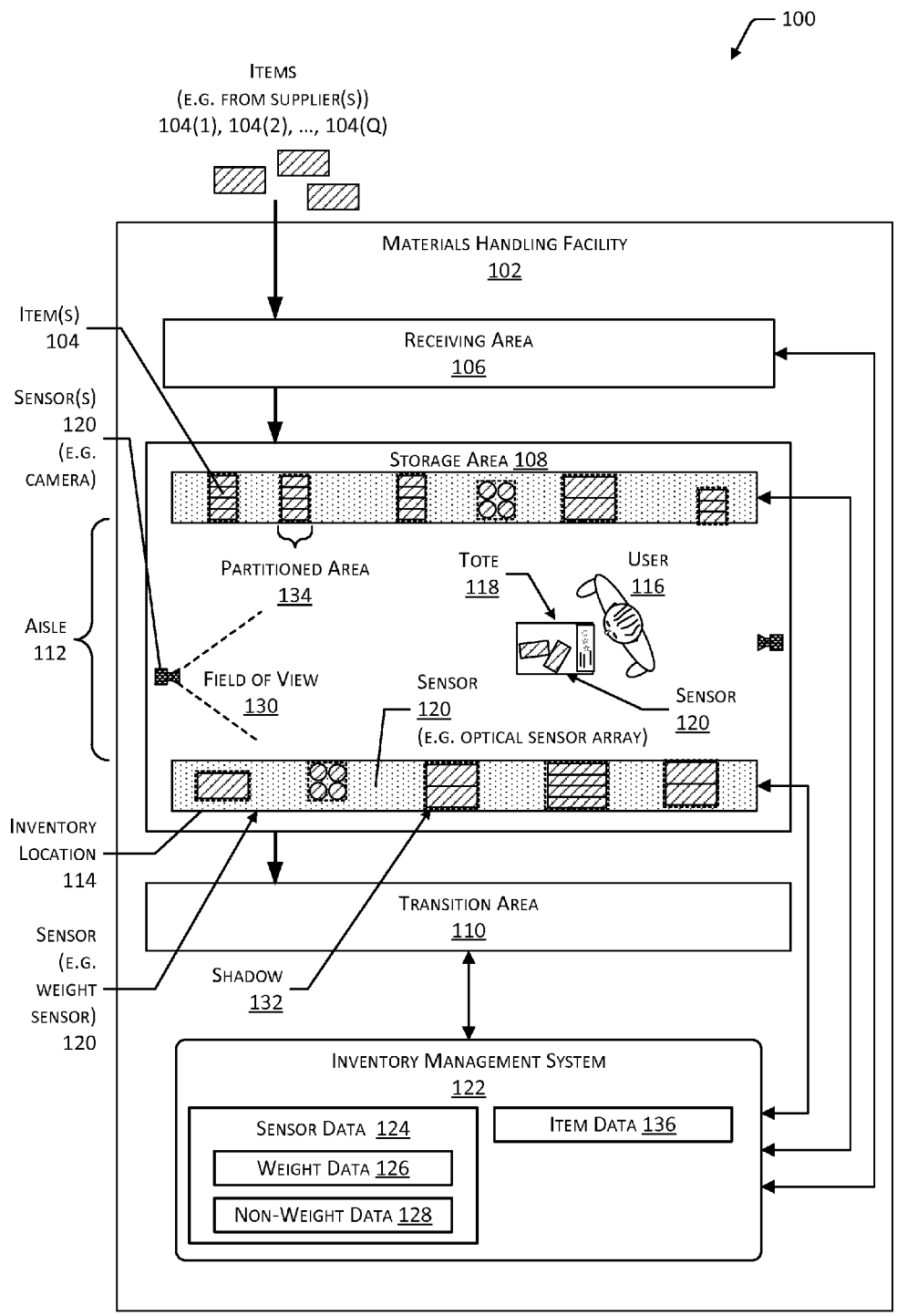
FIG. 1 is a block diagram illustrating a material handling facility (facility) having various sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

At a material handling facility (facility) items may be stowed or held at inventory locations. A single inventory location, such as a shelf or rack, may hold several different types of items. During use of the facility, interactions such as a pick (removal) or place (stowage) of an item from the inventory locations may take place.

The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

During operation, the inventory management system may utilize sensor data acquired from a plurality of sensors at the facility. For example, weight sensors at the inventory location may gather weight data, cameras with fields of view that include the inventory location may gather image data, and so forth.

This disclosure describes systems and techniques for processing sensor data from multiple sensors to generate interaction data indicative of interactions at the facility. Data fusion techniques are used to combine hypotheses data produced using sensor data acquired from one or more sensors.

The hypotheses data may be generated which describes various interactions that could occur. The hypotheses data may be based on one or more of item data, physical configuration data, sensor data, predicted data, and so forth. For example, the hypotheses data may indicate a predicted change in quantity to one of more of the items at a predicted partitioned area of the inventory location. Each hypothesis may include a predicted value such as predicted weight distribution, predicted quantity, and so forth.

The item data may provide information about one or more of the items. This information may include the partitioned area(s) in which the item is designated to be stowed, weight of an individual item, current quantity on hand, and so forth.

A set of hypotheses based on the sensor data from a particular sensor may be determined. For example, a first set of hypotheses may be generated that are consistent with the image data acquired by the imaging sensors. Likewise, a second set of hypotheses may be generated from weight data acquired by the weight sensors.

Hypotheses in the hypotheses data that are inconsistent with the sensor data may be discarded or disregarded from the set of hypotheses. For example, image data that depicts a pick of an item may result in discard of hypotheses that describe the opposite situation of placement of an item. Each hypothesis in a set may include a probability value. The probability may indicate how likely that particular hypothesis is to be true. In some implementations, the probability may be implicit. For example, a hypothesis with no stated probability may be deemed to have a probability of 1.0 of being true.

Confidence values may be determined for at least a portion of hypotheses in a set of hypotheses. The confidence value provides an indicia of how likely a particular hypothesis is to be true, with respect to another hypothesis in the same set. In one implementation, the hypotheses in a set may be sorted or ranked according to their respective probabilities. A first hypothesis having a first probability and a highest rank may be determined. Similarly, a second hypothesis having a second probability less than the first probability and second highest rank may be determined. The confidence level may comprise a difference or ratio between the first probability and the second probability. When the confidence level associated with a particular hypothesis exceeds a confidence threshold value, that hypothesis may be deemed the solution. The resulting solution may then be used to generate the interaction data.

In some situations, a single set of hypotheses based on sensor data from a single sensor or group of sensors of the same type may not produce hypotheses with a high enough confidence value. To generate a solution with a sufficiently high confidence level, two or more sets of hypotheses may be combined. These sets of hypotheses may be generated using one or more of sensor data from different types of sensors, or processing the sensor data using different techniques.

Continuing the example above, the first set of hypotheses based on image data and the second set of hypotheses based on weight data may be combined to determine a third set of hypotheses. In some implementations, the combination of sets of hypotheses may use Bayes' rule. For example, Bayes' rule may be used to aggregate the first set of hypotheses (based on image data) and the second set of hypotheses (based on weight data) by computing a joint probability of the hypotheses representative of concurrent events.

The confidence values may be determined for the hypotheses that appear in the combined sets of hypotheses. For example, the confidence values may be determined for the third set of hypotheses. The confidence value may be compared with the confidence threshold value to determine if the associated hypothesis is deemed to have a "high confidence" or a "low confidence". A "high confidence" hypothesis may be deemed suitable for use as a solution, while a "low confidence" may call for additional processing to produce a "high confidence" hypothesis. When the confidence level associated with the particular hypothesis does not exceed the threshold value, additional sets of hypotheses may be used to determine the solution. For example, when the third set of hypotheses does not include a hypothesis with a confidence value above the threshold value, a fourth set of hypotheses may be generated using the image data. In one implementation, the image data may be processed to determine a count of items that were picked or placed from the inventory location. The fourth set of hypotheses may comprise the output of this processing, indicating hypotheses that describe item quantities based on the image data and the probability that a particular hypothesis is true.

The fourth set of hypotheses also based on the image data may be combined with the third set of hypotheses to generate a fifth set of hypotheses. The confidence levels may be determined for at least a portion of the hypotheses in the fifth set. As above, when the first ranked hypotheses of the fifth set have a confidence value that is above a threshold value, that first ranked hypotheses may be designated as the solution. This solution may then be used to generate interaction data. For example, the interaction data may indicate the inventory location, item identifier indicative of a particular item, change in quantity of the item, and so forth.

The inventory management system may use the interaction data to maintain item data about the items in the facility. For example, where interaction data indicates a pick of a particular quantity of a particular item from a particular inventory location, the item data indicative of quantity on hand of that particular item at that particular location may be decreased accordingly.

By using the devices and techniques described herein, operation of the facility may be improved. Details about interactions between users and items in the facility may be quickly and accurately determined. For example, as items are picked, placed, and so forth, information such as quantity on hand at a given time may be readily determined. As a result, the inventory management system may be able to quickly track what item a user has interacted with, maintain up-to-date item data, and so forth.

Illustrative System

An implementation of a material handling system 100 configured to store and manage inventory items is illustrated in FIG. 1. A material handling facility 102 (facility) comprises one or more physical structures or areas within which one or more items 104(1), 104(2), . . . , 104(Q) may be held. As used in this disclosure, letters in parenthesis such as "(Q)" indicate an integer value greater than or equal to zero. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), . . . , 118(T) or other material handling apparatuses may move within the facility 102. For example, the user 116 may move about within the facility 102 to pick or place the items 104 at various inventory locations 114. For ease of transport, the items 104 may be carried by the tote 118. The tote 118 is configured to carry or otherwise transport one or more items 104. For example, the tote 118 may include a basket, cart, bag, bin, and so forth. In other implementations, other material handling apparatuses such as robots, forklifts, cranes, aerial drones, and so forth, may move about the facility 102 picking, placing, or otherwise moving the items 104. For example, a robot may pick an item 104 from a first inventory location 114(1) and move the item 104 to a second inventory location 114(2). In some implementations, at least a portion of the tote 118 may be designated as an inventory location 114 and may be equipped as described herein with weight sensors.

One or more sensors 120 may be configured to acquire information about events at the facility 102. The sensors 120 may include, but are not limited to, cameras, three-dimensional (3D) sensors, weight sensors, optical sensor arrays, proximity sensors, and so forth. The sensors 120 may be stationary or mobile, relative to the facility 102. For example, the inventory locations 114 may contain weight sensors 120(6) to acquire weight data of items 104 stowed therein, cameras to acquire images of picking or placement of items 104 on shelves, optical sensor arrays to detect shadows of the user's 116 hands at the inventory locations 114, and so forth. In another example, the facility 102 may include cameras to obtain images of the user 116 or other objects in the facility 102. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

During operation of the facility 102, the sensors 120 may be configured to provide sensor data 124, or information based on the sensor data 124, to the inventory management system 122. The sensor data 124 may include weight data 126 obtained from weight sensors 120(6), non-weight data 128 obtained from other sensors 120 such as cameras 120(1), 3D sensors 120(2), optical sensor arrays 120(13), proximity sensors 120(14), light curtains, and so forth. The sensors 120 are described in more detail below.

The weight data 126 comprises data generated by one or more weight sensors 120(6) configured to measure the weight of an inventory location 114 that may stow the items 104. For example, the weight sensor 120(6) may comprise a load cell beneath a load that may include a shelf or platform of the inventory location 114. By reading one or more characteristics of the load cell, the weight of the load may be determined.

The non-weight data 128 may comprise data generated by the non-weight sensors 120, such as cameras 120(1), 3D sensors 120(2), buttons 120(3), touch sensors 120(4), microphones 120(5), optical sensors 120(7), RFID readers 120(8), RF receivers 120(9), accelerometers 120(10), gyroscopes 120(11), magnetometers 120(12), optical sensor arrays 120 (13), proximity sensors 120(14), and so forth. For example, cameras 120(1) may be arranged to have a field of view (FOV) 130 that includes at least a portion of the inventory location 114. Continuing the example, the camera 120(1) may be mounted above the inventory location 114 with the FOV 130 oriented to where the items 104 may be stowed during use.

The inventory management system 122 or other systems may use the sensor data 124 to track the location of objects within the facility 102, movement of the objects, or provide other functionality. Objects may include, but are not limited to, items 104, users 116, totes 118, and so forth. For example, a series of images acquired by the camera 120(1) may indicate removal by the user 116 of an item 104 from a particular location on the inventory location 114 and placement of the item 104 on or at least partially within the tote 118.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102. During use of the facility 102, the user 116 may move about the facility 102 to perform various tasks, such as picking or placing the items 104 in the inventory locations 114.

Objects such as an item 104, hand, robotic manipulator, retrieval tool, and so forth, may exhibit a shadow 132 with respect to the optical sensor array 120(13) at an inventory location 114. The shadow 132 is illustrated with a dotted line in this figure. In one implementation, the optical sensor array 120(13) may be located below the item 104, such as within a shelf upon or above which the item 104 is supported. The shadow 132 may be cast upon the optical sensor array 120(13). For example, where the optical sensor array 120(13) is on a vertical wall behind the items 104, the shadow 132 may comprise the shadow 132 cast on that wall.

The optical sensor array 120(13) may comprise one or more sensors 120, such as optical sensors 120(7). The optical sensors 120(7) may be arranged in a regular, repeating, or periodic two-dimensional arrangement such as a grid. Each of the optical sensors 120(7) may be configured to provide output indicative of a light intensity value. For example, the optical sensors 120(7) may generate an 8-bit value indicative of an intensity of light ranging from value 255 indicating maximum intensity to value 0 indicating minimum intensity. In another implementation, the light intensity value may be a 1-bit value of 0 or 1.

A single optical sensor array 120(13) may be associated with several different items 104. For example, the inventory location 114 may comprise a shelf that includes an optical sensor array 120(13). The shelf may have sufficient space to allow for storage of several different kinds of items 104. Items 104 may be grouped together and placed within a partitioned area 134. The partitioned area 134 may comprise a lane or row of identical items 104 positioned one in front of another. For example, a left half of the shelf may store a first kind of item 104(1), while a right half of the shelf may store a second kind of item 104(2). The inventory management system 122 may be configured to access partition data indicative of which portion of the optical sensor array 120(13), or an output thereof, is associated with a particular item 104.

The optical sensor array 120(13) may generate non-weight data 128 such as image data. The image data may comprise a plurality of pixels. Each pixel may correspond to a position within the two-dimensional arrangement of the optical sensors 120(7) and comprises the light intensity value from the optical sensor 120(7) at the position. In some implementations, the image data may comprise data from a subset of the optical sensors 120(7) within the optical sensor array 120(13). For example, the image data may comprise information from the optical sensors 120(7) corresponding to a particular partitioned area 134. In another example, image data from an optical sensor array 120(13) having a plurality of partitioned areas 134 may be segmented into the respective partitioned areas 134 for further processing.

The inventory management system 122 is configured to use the sensor data 124 and item data 136 to generate interaction data. The item data 136 may include information about the item 104, such as weight, appearance, where the item 104 is stowed, and so forth. The interaction data may provide information about an interaction, such as a pick of an item 104 from the inventory location 114, a place of an item 104 to the inventory location 114, a touch made to an item 104 at the inventory location 114, a gesture associated with an item 104 at the inventory location 114, and so forth. For example, the gesture may include the user 116 reaching towards the item 104 held by the inventory location 114.

The interaction data may include one or more of the type of interaction, partitioned area 134 involved, item identifier, quantity change to the item 104, user identifier, and so forth. The interaction data may then be used to further update the item data 136. For example, the quantity of items 104 on hand at a particular partitioned area 134 may be changed based on an interaction that picks or places one or more items 104.

The inventory management system 122 may use the sensor data 124 to determine the interaction. Weight characteristics about an interaction may be determined using the weight data 126. These weight characteristics may include weight before an interaction, weight after an interaction, amount of change in the weight of the inventory location 114, weight distribution of the inventory location 114 at the weight sensors 120(6), a change in the weight distribution of the inventory location 114, and so forth. For example, an inventory location 114 may stow a single type of item 104. A count of the quantity of items 104 picked or placed may be determined by dividing the change in weight associated with an interaction by the weight of a single item 104 as stored in the item data 136.

In some implementations, a single inventory location 114 may stow several different types of items 104, such as arranged in different partitioned areas 134 as described above. The inventory management system 122 may use the weight data 126 to determine weight characteristics, and use those weight characteristics to identify the item 104 that was picked or placed. For example, a change in the weight distribution, direction and distance of a change in the center-of-mass weight, and so forth, may be indicative of a pick or place of an item 104 from a particular partitioned area 134. The inventory management system 122 may also use the weight data 126 to determine the quantity picked or placed during an interaction, such as described above. However, in some situations, the same set of weight characteristics may correspond to several possible hypotheses. For example, given cans of approximately equal weight, placement of two cans of pet food at a first distance from an origin may result in the same weight distribution as a placement of one can at twice that distance from the origin.

The inventory management system 122 may use non-weight data 128, such as image data, to determine other information about the interaction. For example, the image data may be used to determine if motion is present at the inventory location 114, if the appearance of the inventory location 114 has changed indicative of whether an item 104 has been added or removed, to determine a count of items at the inventory location 114, and so forth.

Hypotheses based on this image data may be generated. For example, the hypotheses may indicate predicted item identifiers and a probability that the predicted item identifier is associated with the interaction. In another example, the hypotheses may indicate a predicted item quantity of the interaction and a probability that the predicted item quantity is associated with the interaction.

The inventory management system 122 may be configured to generate, access, or otherwise determine hypotheses having predicted characteristics that correspond to measured characteristics observed in the sensor data 124. Based on the probabilities associated with the hypotheses, a particular hypothesis may be designated a solution, and the predicted values of that hypothesis may be deemed to reflect the actual interaction.

The process of using the sensor data 124 to generate interaction data is discussed in more detail below. For example, FIGS. 9-11 describe various processes for determining a hypothesis based on information derived from weight data 126 and non-weight data 128.

In some implementations, items 104 may be processed, such as at the receiving area 106, to generate at least a portion of the item data 136. For example, an item 104 not previously stored by the inventory management system 122 may be photographed by the camera 120(1), weighed, placed on an optical sensor array 120(13) and data about a shadow 132 generated, and so forth. Continuing the example, the item data 136 generated may include the weight of a single item 104, a center-of-mass of the single item 104, an area of the shadow 132, appearance of the item 104, absorption threshold comprising data indicative of transparency of the item 104, and so forth.

During configuration of the system 100, the weight distribution of a fully laden inventory location 114 may be stored, as well as the weight distribution of an inventory location 114 that is empty of items 104.

By using the sensor data 124, the inventory management system 122 is able to maintain item data 136 such as inventory levels of a particular item 104 at a particular inventory location 114, generate billing information without manual intervention by a user 116, or provide other functions. For example, the user 116 may pick an item 104 from the inventory location 114. Using the interaction data based on the sensor data 124 and in conjunction with the item data 136, the inventory management system 122 may correctly determine that a quantity of two cans of dog food have been picked and bill the user 116 accordingly for the sale price of the item 104.

Figure 2:
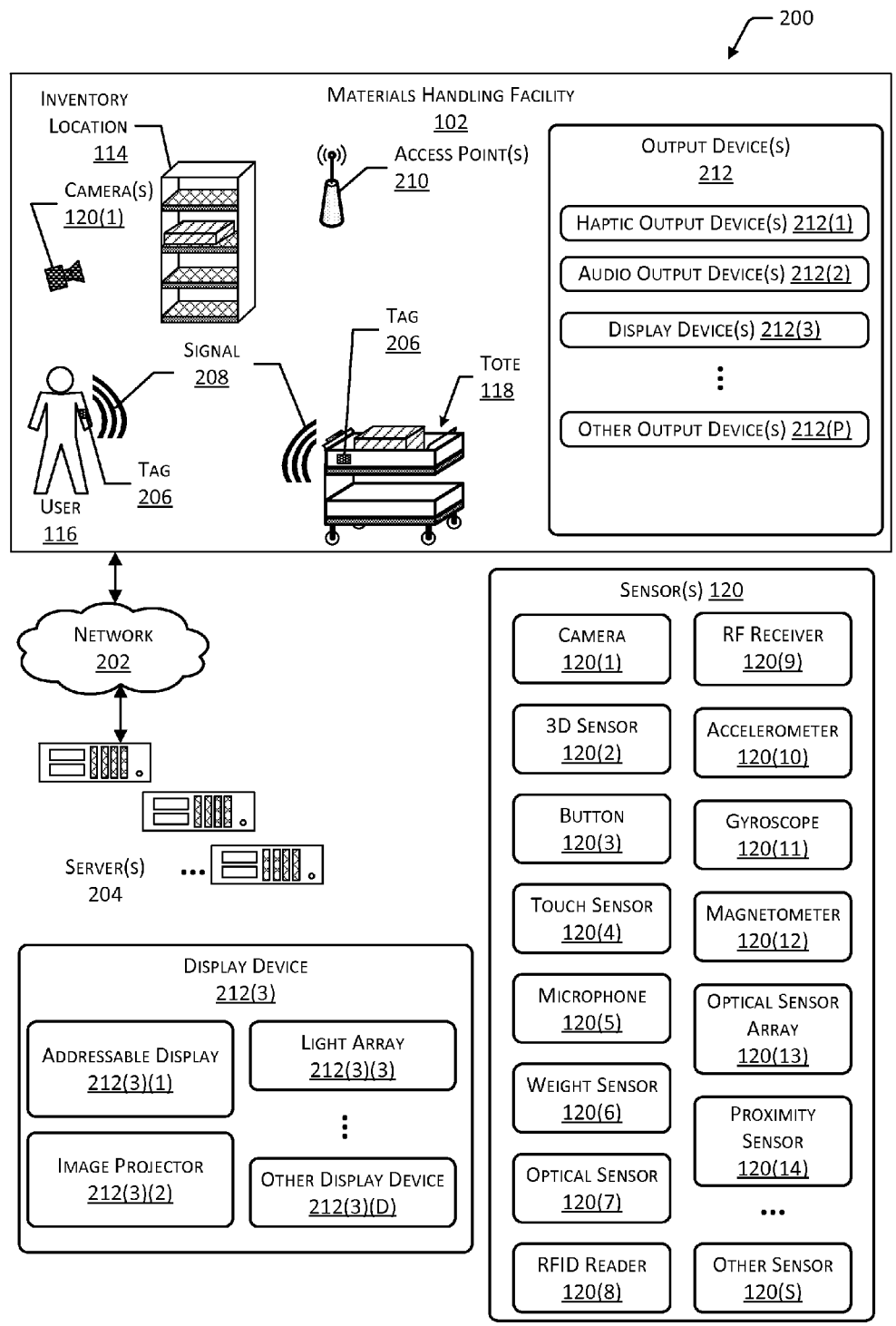
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cables, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122, and so forth. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102, on the exterior of the facility 102, and so forth. For example, the sensors 120 may be mounted on or within a floor, wall, at a ceiling, at an inventory location 114, on a tote 118, may be carried or worn by a user 116, and so forth.

The sensors 120 may include one or more cameras 120(1) or other imaging sensors. The one or more cameras 120(1) may include imaging sensors configured to acquire images of a scene. The cameras 120(1) are configured to detect light in one or more wavelengths including, but not limited to, terahertz, infrared, visible, ultraviolet, and so forth. The cameras 120(1) may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a FOV 130 of a sensor 120. The 3D sensors 120(2) may include range cameras, lidar systems, sonar systems, radar systems, structured light systems, stereo vision systems, optical interferometry systems, and so forth. The inventory management system 122 may use the 3D data acquired by the 3D sensors 120(2) to identify objects, determine a location of an object in 3D real space, and so forth.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. For example, the weight sensor 120(6) may comprise a load cell having a strain gauge and a structural member that deforms slightly when weight is applied. By measuring a change in the electrical characteristic of the strain gauge, such as capacitance or resistance, the weight may be determined. The inventory management system 122 may use the data acquired by the weight sensors 120(6) to identify an object, determine a change in the quantity of objects, determine a location of an object, maintain shipping records, and so forth.

The sensors 120 may include one or more optical sensors 120(7). The optical sensors 120(7) may be configured to provide data indicative of one or more of color or intensity of light impinging thereupon. For example, the optical sensor 120(7) may comprise a photodiode and associated circuitry configured to generate a signal or data indicative of an incident flux of photons. As described below, the optical sensor array 120(13) may comprise a plurality of the optical sensors 120(7). For example, the optical sensor 120(7) may comprise an array of ambient light sensors such as the ISL76683 as provided by Intersil Corporation of Milpitas, Calif., USA, or the MAX44009 as provided by Maxim Integrated, Inc. of San Jose, Calif., USA. In other implementations, other optical sensors 120(7) may be used. The optical sensors 120(7) may be sensitive to one or more of infrared light, visible light, or ultraviolet light. For example, the optical sensors 120(7) may be sensitive to infrared light, and infrared light sources such as LEDs may be used to provide illumination. The optical sensors 120(7) may include photodiodes, photoresistors, photovoltaic cells, quantum dot photoconductors, bolometers, pyroelectric infrared detectors, and so forth. For example, the optical sensor 120(7) may use germanium photodiodes to detect infrared light.

One or more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and RFID readers 120(8) having different locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

The sensors 120 may also include one or more gyroscopes 120(11). The gyroscope 120(11) may provide information indicative of rotation of an object affixed thereto. For example, the tote 118 or other objects may be equipped with a gyroscope 120(11) to provide data indicative of a change in orientation of the object.

One or more magnetometers 120(12) may be included as sensors 120. The magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

As described above, the optical sensor array 120(13) may comprise one or optical sensors 120(7). The optical sensors 120(7) may be arranged in a regular, repeating, or periodic two-dimensional arrangement such as a grid. The optical sensor array 120(13) may generate image data.

The sensors 120 may include proximity sensors 120(14) used to determine a presence of an object, such as the user 116, the tote 118, and so forth. The proximity sensors 120(14) may use optical, electrical, ultrasonic, electromagnetic, or other techniques to determine a presence of an object. In some implementations, the proximity sensors 120(14) may use an optical emitter and an optical detector to determine proximity. For example, an optical emitter may emit light, a portion of which may then be reflected by the object back to the optical detector to provide an indication that the object is proximate to the proximity sensor 120(14). In other implementations, the proximity sensors 120(14) may comprise a capacitive proximity sensor 120(14) configured to provide an electrical field and determine a change in electrical capacitance due to presence or absence of an object within the electrical field.

The proximity sensors 120(14) may be configured to provide sensor data 124 indicative of one or more of a presence or absence of an object, a distance to the object, or characteristics of the object. An optical proximity sensor 120(14) may use time-of-flight (ToF), structured light, interferometry, or other techniques to generate sensor data 124 such as distance. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor such as a camera 120(1). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth.

In some implementations, a proximity sensor 120(14) may be installed at the inventory location 114. The non-weight data 128 generated by the proximity sensor 120(14) may be used in conjunction with the weight data 126 as described in this disclosure. For example, the optical proximity sensor 120(14) may generate non-weight data 128 indicative of the user 116 being within a threshold distance of an inventory location 114. Based on the non-weight data 128, the inventory management system 122 may generate activity data indicative of the presence of the user 116. By using the activity data, the inventory management system 122 may determine that the weight data 126 is reliable and subsequently use changes in the weight data 126 to change the item data 136 indicative of a quantity on hand.

The sensors 120 may include other sensors 120(S) as well. For example, the other sensors 120(S) may include light curtains, ultrasonic rangefinders, thermometers, barometric sensors, hygrometers, biometric input devices including, but not limited to, fingerprint readers or palm scanners, in-shelf sensors, and so forth. For example, the inventory management system 122 may use information acquired from light curtains to determine where the user 116 has reached into an inventory location 114. The light curtain may comprise one or more pairs of optical emitters and detectors. An object, such as a hand of the user 116, that blocks a beam of light sent from the optical emitter to the detector provides an indication of the location of the user's 116 hand. In another example, in-shelf sensors may generate sensor data 124 indicative of a position of an auto-facing unit, proximity of an item 104 at the inventory location 114, and so forth.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi, NFC, Bluetooth, or other technologies to establish wireless communications between a device and the network 202. The wireless networks allow the devices to communicate with one or more of the sensors 120, the inventory management system 122, the optical sensor arrays 120(13), the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to provide illumination of the optical sensor array 120(13).

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) may be configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 212(3) may be configured to provide output, which may be seen by the user 116 or detected by a light-sensitive sensor such as a camera 120(1) or an optical sensor 120(7). In some implementations, the display devices 212(3) may be configured to produce output in one or more of infrared, visible, or ultraviolet light. The output may be monochrome or color.

The display devices 212(3) may be emissive, reflective, or both. An emissive display device 212(3) is configured to emit light during operation. For example, the emissive display device 212(3) may produce an image using LEDs. In comparison, a reflective display device 212(3) relies on ambient light to present an image. For example, the reflective display device 212(3) may use an electrophoretic element that emits no light. Backlights or front lights may be used to illuminate non-emissive display devices 212(3) to provide visibility of the output in conditions where the ambient light levels are low.

The display devices 212(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 212(3) may use a light source and an array of MEMS-controlled mirrors to selectively direct light from the light source to produce an image. These display mechanisms may be configured to emit light, modulate incident light emitted from another source, or both. The display devices 212(3) may operate as panels, projectors, and so forth.

The display devices 212(3) may be configured to present images. For example, the display device 212(3) may comprise an addressable display 212(3)(1). The addressable display 212(3)(1) may comprise elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise a segmented electrophoretic display device 212(3), segmented LED, and so forth. The addressable display 212(3)(1) may be used to present information such as a stock keeping unit (SKU) number, quantity on hand, and so forth. The display devices 212(3) may also be configurable to vary the color of the segment, such as using multicolor/multi-wavelength LED segments.

The display devices 212(3) may include image projectors 212(3)(2). For example, the image projector 212(3)(2) may be configured to project an image onto objects, illuminate at least a portion of an optical sensor array 120(13), and so forth. The image may be generated using MEMS, LCOS, lasers, and so forth.

The display devices 212(3) may include a light array 212(3)(3). The light array 212(3)(3) may comprise a plurality of discrete emissive elements configurable to emit light. The discrete emissive elements (or assemblies thereof) may be separated from one another by a distance such that, when image data of the light array 212(3)(3) is acquired, one emissive element may be distinguished from another. For example, the light array 212(3)(3) may comprise a plurality of infrared LEDs separated by at least 0.5 centimeters.

Other display devices 212(3)(D) may also be used in conjunction with the facility 102. The display devices 212(3) may be located at various points within the facility 102. For example, the addressable displays 212(3)(1) or the light arrays 212(3)(3) may be located on inventory locations 114, totes 118, in or on the floor of the facility 102, and so forth.

Other output devices 212(P) may also be present. For example, the other output devices 212(P) may include scent/odor dispensers, document printers, 3D printers or fabrication equipment, and so forth.

Figure 3:
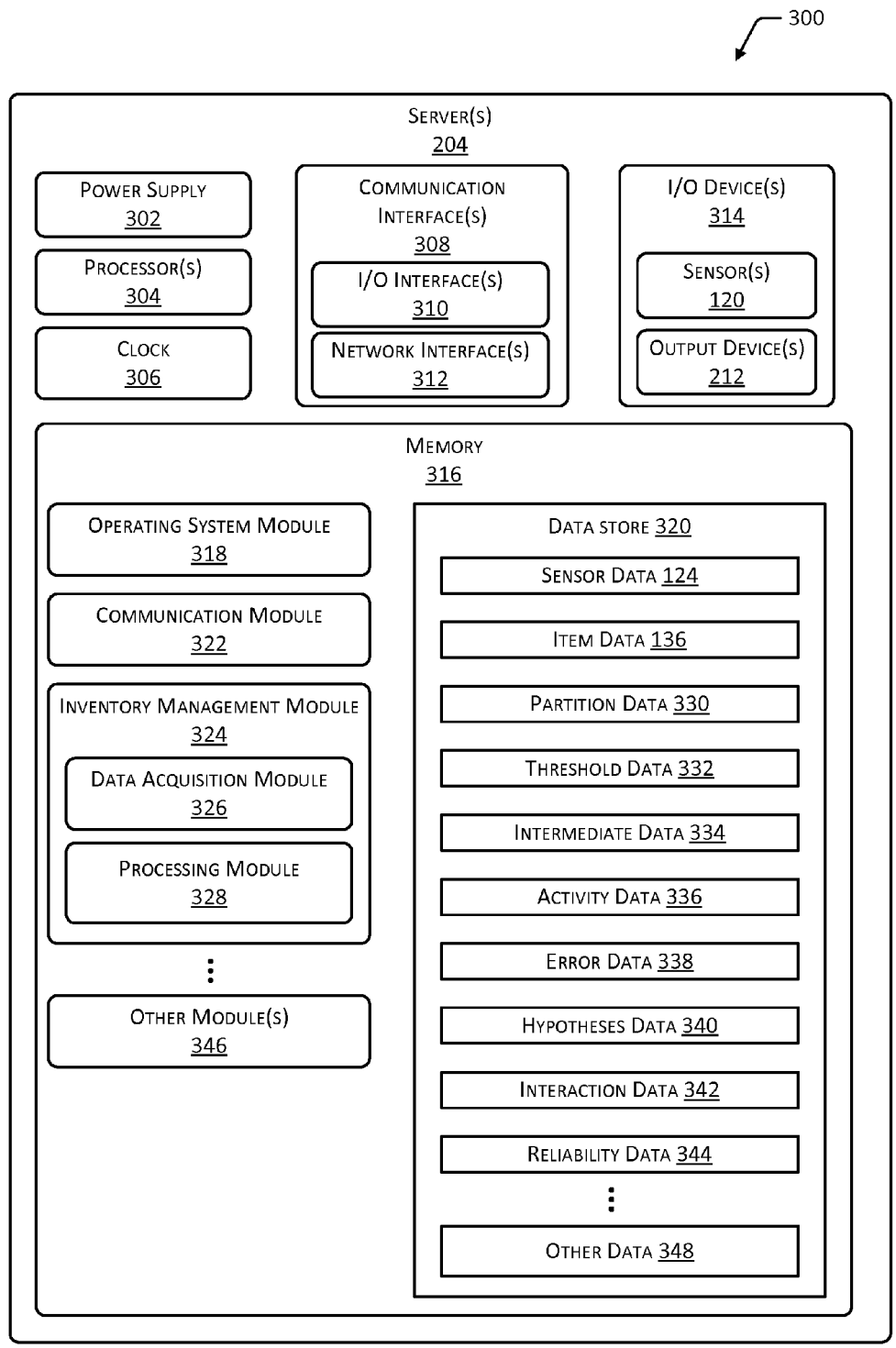
FIG. 3 is a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 may be configured to provide electrical power suitable for operating the components in the server 204. The one or more power supplies 302 may comprise batteries, capacitors, fuel cells, photovoltaic cells, wireless power receivers, conductive couplings suitable for attachment to an external power source such as provided by an electric utility, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to associate a particular interaction with a particular point in time.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 may be configured to provide communications between the server 204 and other devices, such as the totes 118, routers, access points 210, and so forth.

The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320, or a portion thereof, may be distributed across one or more other devices including the servers 204, network attached storage devices, and so forth.

A communication module 322 may be configured to establish communications with one or more of the totes 118, sensors 120, display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or a processing module 328. The data acquisition module 326 may be configured to acquire and access information associated with operation of the facility 102. For example, the data acquisition module 326 may be configured to acquire sensor data 124 from one or more of the sensors 120. This information may be stored in the data store 320 as part of the sensor data 124.

The processing module 328 may be configured to use one or more of sensor data 124, item data 136, partition data 330, threshold data 332, or other information to generate intermediate data 334. One or more of the sensor data 124 or the intermediate data 334 may be used to generate activity data 336. In some implementations, the activity data 336 may be used to determine one or more hypotheses of the hypotheses data 340.

The threshold data 332 may comprise one or more thresholds associated with operation of the processing module 328. For example, the threshold data 332 may specify a tolerance or accepted extent of deviation permitted between a hypothesis and the observed sensor data 124. In another example, the threshold data 332 may include a threshold indicating a minimum count of pixels that, if different, designate a change has occurred in image data. The threshold data 332 may include other thresholds, such as a confidence value threshold, an interaction threshold period, and so forth. In some implementations, the threshold data 332 may include constraint data, such as described below that may be used to constrain the hypotheses data 340.

In some implementations, the threshold data 332 may be based on the error data 338. For example, the threshold values may be dynamically adjusted. A probability density function may be used to determine probability that a variance in weight is due to sensor error, rather than a measured change in load. This probability may be used to set or define the threshold value.

Error data 338 may be stored in the data store 320. The error data 338 may comprise one or more probability density functions. The probability density functions describe weight sensor error as a function of weight measured. For example, the probability density function may indicate that a change in weight of 400 g as measured by the weight sensor 120(6) of the inventory location 114 has a probability of 0.01 of occurring as a result of noise or sensor error.

The probability density function may be determined based on theoretical modelling, weight data 126 obtained from weight sensors 120(6), or a combination thereof. For example, the weight data 126 may be obtained by picking and placing objects of known weights onto a representative inventory location 114 equipped with weight sensors 120(6) and comparing the known weight to the weight recorded. Different probability density functions, and corresponding error data 338, may be associated with different designs of inventory location 114. For example, an inventory location 114 that is configured to store dry items 104 may have a different probability density function than an inventory location 114 that is configured to store frozen items 104.

In some implementations, the error data 338 may comprise a lookup table based on the probability density function. In other implementations, an equation or expression descriptive of the probability density function may be used to determine the probability associated with a particular weight.

The processing module 328 may be configured to determine or otherwise utilize the hypotheses data 340 during operation. The hypotheses data 340 may comprise different combinations of values for variables and the corresponding predicted characteristics based on those different values. The variables may include quantities of items 104, placement of the item 104 within the partitioned areas 134 of a particular inventory location 114, weight characteristics, and so forth. The weight characteristics may include, but are not limited to, position of a center-of-mass (COM), direction of a change in the COM from one time to another, location of a weight change (LWC), and so forth. For example, instead of or in addition to the weight distribution, the COM of the inventory location 114 may be determined using measured weight data 126 and compared with a predicted COM in the hypotheses data 340. In another example, the hypotheses data 340 may include a predicted change in the weight distribution data. A change in the weight distribution data may be obtained by subtracting weight distribution data associated with a first time (or condition) from weight distribution data associated with a second time (or condition). For example, the predicted weight distribution change may be based on a change in the quantity of items at one or more of the partitioned areas 134.

In some implementations, the hypotheses data 340 may be constrained. For example, the hypotheses data 340 may exclude situations such as a simultaneous pick and place of items 104 in the same interaction, simultaneous removal of items 104 from different partitioned areas 134, interactions involving a minimum or maximum number of items 104, and so forth. Continuing the example, constraint data may be specified which limits the hypotheses data 340 to those hypotheses that do not have predicted quantities that exceed the stowage capacity of the inventory location 114, the partitioned area 134, and so forth.

The hypotheses data 340 may be at least partially precomputed. For example, given the item data 136 indicating what items 104 are intended to be stored, weight of the items 104, and so forth, various permutations of weight distributions may be generated corresponding to different hypotheses.

A first set of hypotheses may be generated using the non-weight data 128. For example, image data may be processed using machine vision techniques to determine a change in appearance at a particular partitioned area 134. This change in appearance, such as the addition or removal of an item 104, indicates interaction with the particular item 104 associated with that partitioned area 134. Based on this information, corresponding first set of hypotheses data 340 may be generated that comprises a data structure with information such as:

Image Hypothesis 1=One item identified as SKU #12345 with a probability of being true of 0.95.
Image Hypothesis 2=Two items identified as SKU #12345 and #67890 with a probability of being true of 0.03.
Image Hypothesis 3=Item identified as SKU #88771 with a probability of being true of 0.02.

The weight data 126 may be used to determine hypotheses data 340 as well. For example, a second set of hypotheses may be generated that comprises a data structure with information such as:

Weight Hypothesis 1=Quantity of 2 cans of pet food SKU #12345 removed from partitioned area 134(1) exhibits a weight distribution of 3213 g left and 2214 g right, a change in weight of 910 g, and a probability of being true of 0.42.
Weight Hypothesis 2=Quantity of 1 can of pet food SKU #12345 removed from partitioned area 134(2) and quantity of 2 cans of pet food SKU #67890 removed from partitioned area 134(1) exhibits a weight distribution of 2523 g left and 2424 g right, and a change in weight of 1390 g, and a probability of being true of 0.14.
Weight Hypothesis 3=Quantity of 1 box of pet food SKU #88771 removed from partitioned area 134(3) exhibits a weight distribution of 3523 g left and 1917 g right, and a change in weight of 897 g, and a probability of being true of 0.44.

A solution may be determined from a set of one or more hypotheses based on a confidence value. The confidence value may be determined based on a difference or ratio between probability values of two or more hypotheses in the hypotheses data 340. In one implementation, the confidence value may be calculated as a difference between the probabilities of the top two hypotheses in a set of hypotheses, when ranked by probability. For example, the hypotheses data 340 may include a first set of hypotheses based on non-weight data 128, such as image data, from the example above that are ranked in descending order of probability in Table 1.

TABLE 1

| Hypothesis | Probability | Rank |
|---|---|---|
| Image Hypothesis 1 | 0.95 | First |
| Image Hypothesis 2 | 0.03 | Second |
| Image Hypothesis 3 | 0.02 | Third |

The confidence value may be determined as a difference between the probabilities of the first and second ranked hypotheses. In this example, the confidence value for the first ranked Image Hypothesis 1 is 0.95−0.03=0.92. In other implementations, the confidence value may comprise a ratio.

Continuing the example above, the hypotheses data 340 may include the second set of hypotheses based on weight data 126 from the example above that are ranked in descending order of probability in Table 2.

TABLE 2

| Hypothesis | Probability | Rank |
|---|---|---|
| Weight Hypothesis 3 | 0.44 | First |
| Weight Hypothesis 1 | 0.42 | Second |
| Weight Hypothesis 2 | 0.14 | Third |

In this example, the confidence value for the first ranked Image Hypothesis 1 is 0.44−0.42=0.02.

The confidence value may be compared to a confidence threshold value. For example, the confidence threshold value may be 0.60. Hypotheses with confidence values below the threshold may be deemed to have a "low confidence" while those at or above the threshold may be deemed to have "high confidence". The first ranked hypothesis that has a confidence value above the confidence threshold may be deemed a solution.

Low confidence hypotheses, or the set of hypotheses of which they are a part, may be combined or aggregated with one or more other sets of hypotheses to produce one or more high confidence hypotheses. For example, the weight hypotheses of the second set of hypotheses provide information about what items 104 and the quantities of the interaction, but no "high confidence" hypotheses are available. To improve the confidence value, additional sets of hypotheses may be combined. These additional sets of hypotheses may be based on sensor data 124 from other sensors 120, from output resulting from different processing of the same sensor data 124, and so forth. Continuing the example above, the first set of hypotheses may be generated based on the non-weight data 128 while the second set of hypotheses are generated based on the weight data 126. At least a portion of the first set of hypotheses and the second set of hypotheses may be combined.

The individual hypotheses from different sets may be combined and an aggregate probability may be determined. For example, the first set of hypotheses and the second set of hypotheses may be combined to form a third set of hypotheses. In one implementation, a combined probability that is the product of the probabilities of pairs of hypotheses from the first set and the second set may be calculated. For example, the aggregate probability for the hypotheses may be:

TABLE 2

| Hypothesis | Image Probability | Weight Probability | Combined Probability | Rank |
|---|---|---|---|---|
| Combined 1 | 0.95 | 0.42 | 0.399 | First |
| Combined 3 | 0.02 | 0.44 | 0.009 | Second |
| Combined 2 | 0.03 | 0.14 | 0.004 | Third |

The combined hypothesis that has the greatest combined probability may be deemed to be the solution. In this example, the solution describes two cans of the item 104 having SKU #12345 being removed from the partitioned area 134(1). The solution may then be used to generate interaction data 342 that describes the removal of two cans of pet food having SKU #12345 from the partitioned area 134(1). The quantity on hand at that partitioned area 134(2) may be decreased accordingly, and the quantity determined to be in possession of the user 116 may be increased accordingly.

In other implementations, instead of or in addition to the probabilities, the measured change in characteristics such as weight distribution data may be compared with the predicted change in characteristics to determine a solution. For example, the determination of the hypotheses may be based on the absolute value of the difference between the measured weight distribution and the predicted weight distribution exceeding a threshold value.

In some implementations, the error data 338 may be used to determine a particular hypothesis in the hypotheses data 340. For example, the error data 338 may be used to determine a probability that a variance between the predicted weight distribution and the measured weight distribution is due to a sensor error. A high probability may indicate that the particular variance is the result of a sensor error and not a change in load. The processing module 328 may generate a score based on the probability of the error data 338.

The processing module 328 may generate reliability data 344 indicative of the reliability of weight data 126 based on non-weight data 128. For example, the reliability data 344 may indicate that the weight data 126 is unreliable when no activity at the inventory location 114 is detected. As a result, spurious data is not processed, preventing incorrect changes in quantity on hand, or other effects.

Operation of the processing module 328 and the various data involved including the intermediate data 334, activity data 336, hypotheses data 340, reliability data 344, and so forth, is discussed in more detail below.

Processing of the sensor data 124, intermediate data 334, or other data may be performed by the processing module 328 or other modules implementing, at least in part, one or more of the following tools or techniques. In one implementation, the OpenCV library as developed by Intel Corporation of Santa Clara, Calif., USA; Willow Garage of Menlo Park, Calif., USA; and Itseez of Nizhny Novgorod, Russia, with information available at www.opencv.org may be used. In another implementation, functions available in the OKAO machine vision library as promulgated by Omron Corporation of Kyoto, Japan, may be used to process the sensor data 124.

Techniques such as artificial neural networks (ANN), active appearance models (AAM), active shape models (ASM), principal component analysis (PCA), and so forth, may also be used to process the sensor data 124, the intermediate data 334, the activity data 336, or other data. For example, the ANN may be a trained using a supervised learning algorithm such that object identifiers are associated with images of particular objects within training images provided to the ANN. Once trained, the ANN may be provided with the sensor data 124 such as the image data from a camera 120(1), and may provide, as output, the object identifier. For example, the ANN may be trained to recognize a particular item 104 at the inventory location 114, determine a count of items 104 in a particular partitioned area 134, and so forth.

Other modules 346 may also be present in the memory 316, as well as other data 348, in the data store 320. For example, the other modules 346 may include an accounting module while the other data 348 may include billing data. The accounting module may be configured to assess charges to accounts associated with particular users 116 or other entities, while the billing data may include information such as payment account numbers. In some implementations, the other data 348 may include physical configuration data. The physical configuration data may indicate dimensions of an inventory location 114, placement of weight sensors 120(6), tare weight of the inventory location 114, and so forth.

Figure 4:
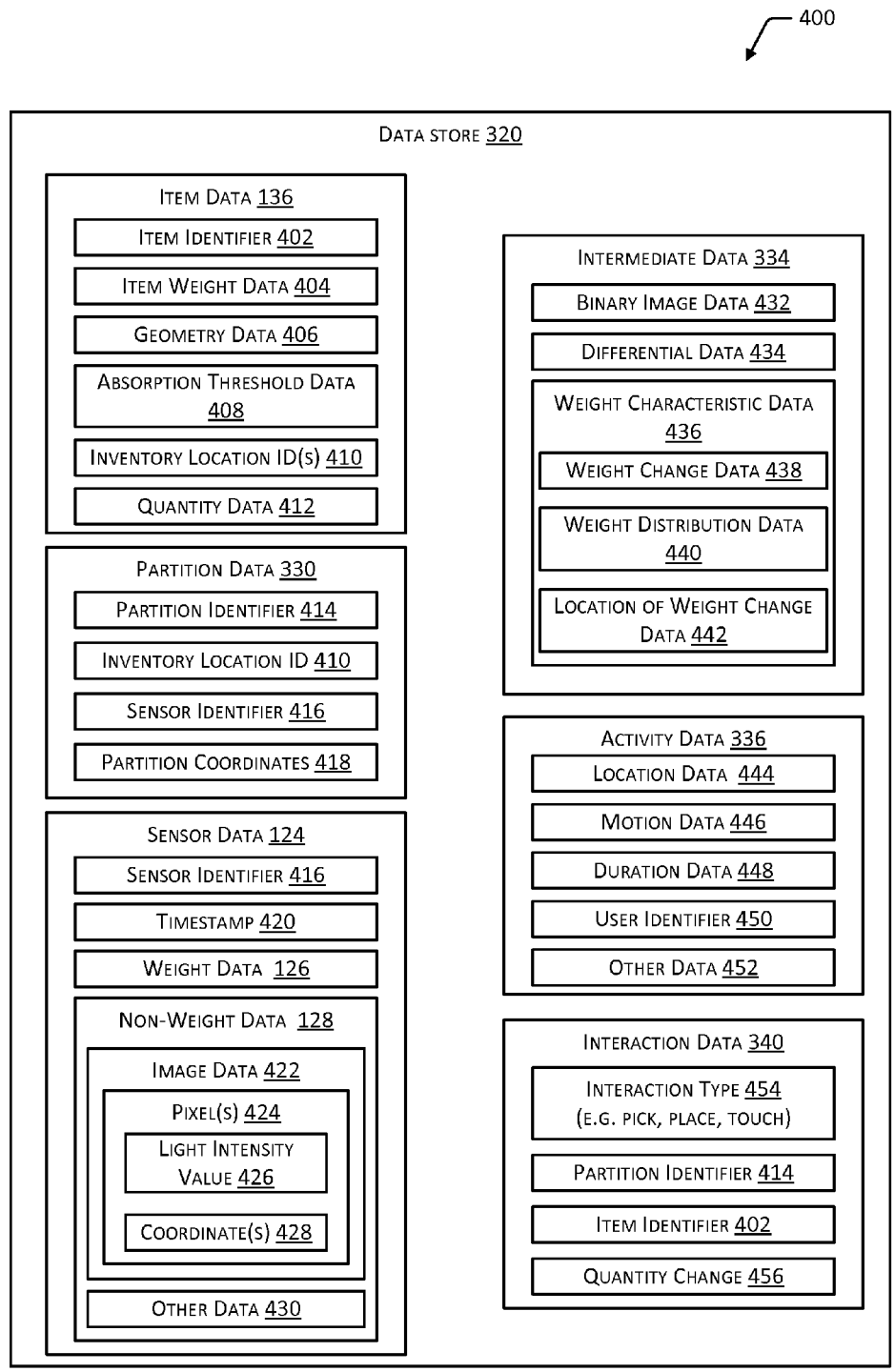
FIG. 4 is a block diagram of additional data that may be used by the server to support operation of the facility, according to some implementations.

FIG. 4 is a block diagram 400 of additional data that may be used by the server 204 to support operation of the facility 102, according to some implementations. This data may be stored at least in part by the data store 320. As described above with regard to FIG. 3, the inventory management module 324 may use the sensor data 124 to generate other information such as interaction data 342 indicative of what item 104 a user 116 has interacted with.

The processing module 328 may access item data 136. The item data 136 may include an item identifier 402. The item identifier 402 may be used to distinguish one item 104 from another. For example, the item identifier 402 may include a SKU, Universal Product Code (UPC) number, and so forth. The items 104 that are of the same type may be referred to by the same item identifier 402. For example, 450 g cans of dog food may be represented by the item identifier 402 value of "9811901181". In other implementations, non-fungible items 104 may each be provided with a unique item identifier allowing each item 104 to be distinguished from one another.

The item data 136 may include one or more of item weight data 404, geometry data 406, or absorption threshold data 408. The item weight data 404 comprises information indicative of a weight of the item 104, package, kit, or other grouping considered to be a single item 104. The geometry data 406 may comprise information indicative of an area of a shadow 132 of the item 104, within an image of the item 104 acquired by a camera 120(1), and so forth. For example, the geometry data 406 may comprise an area as measured in pixels, square centimeters, and so forth. The geometry data 406 may be for a single item 104 or a package or kit of objects considered to be a single item 104.

The geometry data 406 may also comprise information indicative of the shape of the item 104, such as in the shadow 132, an image acquired from a camera 120(1), and so forth. The geometry data 406 may comprise information indicative of one or more contours of the item 104. For example, the geometry data 406 may comprise information indicating that the shadow 132 of the item 104 is a rectangle measuring three pixels by seven pixels.

The absorption threshold data 408 provides information indicative of how transparent the item 104 is to the light detected by the optical sensor array 120(13). For example, the absorption threshold data 408 may comprise a $75^{th}$ percentile value of the light intensity values of the pixels that are within a contour of the shadow 132 of the single item 104. The absorption threshold data 408 may be used to generate intermediate data 334, such as binary image data described below.

The item data 136 may include one or more inventory location identifiers (IDs) 410. The inventory location IDs 410 are indicative of a particular inventory location 114 that is designated for stowage of the item 104. The item data 136 may also include quantity data 412. The quantity data 412 may comprise a count or value indicative of a number of items 104. The count may be a measured or estimated value. The quantity data 412 may be associated with a particular inventory location ID 410, such as when the same item 104 is stowed at several different inventory locations 114 or in a particular partitioned area 134. In other implementations, the item data 136 may include other data, such as an image of the item 104.

The partition data 330 may include one or more of a partition identifier 414, inventory location ID 410, a sensor identifier 416, or partition coordinates 418. As described above, a single inventory location 114 with an optical sensor array 120(13) may stow several different kinds of items 104, with each item 104 being associated with a different item identifier 402. For example, the optical sensor array 120(13) may be incorporated into a shelf of the inventory location 114. Three different items 104(1), 104(2), and 104(3) may be stored on that same shelf serviced by a single optical sensor array 120(13), with each item 104 in a partitioned area 134(1), 134(2), 134(3), respectively.

The partition identifier 414 comprises data indicative of a particular partitioned area 134. The partition identifier 414 may be unique in the context of a particular inventory location 114, aisle 112, facility 102, or globally across multiple facilities 102. The inventory location ID 410 included in the partition data 330 may associate the particular partition identifier 414 with a particular inventory location 114. The particular inventory location 114 may then be associated with the item identifier 402 indicative of the items 104 stored therein.

The sensor identifier 416 comprises data indicative of a particular sensor 120, such as a certain camera 120(1), optical sensor array 120(13), proximity sensor 120(14), and so forth. The sensor identifier 416 may be unique in the context of a particular inventory location 114, aisle 112, facility 102, or globally across multiple facilities 102.

The partition coordinates 418 may specify an area that encompasses the partitioned area 134. For example, the partition coordinates 418 may specify the location in space with respect to an origin of two or more of corners of a rectangular partitioned area 134, a distance relative to an origin, and so forth.

The sensor data 124 may be generated or acquired by one or more sensors 120. The sensor data 124 may include one or more of the sensor identifiers 416, a timestamp 420, weight data 126, or non-weight data 128. The timestamp 420 may comprise information indicative of a time when the sensor data 124 was acquired. For example, the timestamp 420 may be based at least in part on time data obtained from a clock onboard the sensor 120, by the clock 306 on the server 204, and so forth. The inventory management module 324 may use the timestamp 420 to associate weight data 126 with non-weight data 128 and a corresponding time.

As described above, the sensor data 124 may be broadly categorized as comprising weight data 126 and non-weight data 128. For example, the weight data 126 may comprise information obtained from one or more the weight sensors 120(6). Conversely, the non-weight data 128 may comprise information obtained from the sensors 120 other than the weight sensors 120(6). For example, the non-weight data 128 may be obtained from the cameras 120(1), 3D sensors 120(2), optical sensors 120(7), optical sensor arrays 120 (13), proximity sensors 120(14), and so forth.

In some implementations, the non-weight data 128 may comprise image data 422. The image data 422 may be obtained from one or more sensors 120, such as a camera 120(1), a 3D sensor 120(2), or optical sensor array 120(13). The image data 422 may comprise one or more pixels 424. In one implementation, the image data 422 may be represented as a two-dimensional matrix.

In the implementation where the image data 422 is provided by an optical sensor array 120(13), the pixels 424 may comprise data acquired from one or more of the optical sensors 120(7). For example, a single optical sensor 120(7) may be represented by a single pixel 424. Each pixel 424 may include information indicative of a light intensity value 426. The light intensity value 426 provides information indicative of a flux of light impinging upon the optical sensor 120(7) at a particular time. For example, the light intensity value 426 may comprise an 8 or 16 bit value produced by the optical sensor 120(7). The pixel 424 may also include information indicative of a coordinate 428 or relative position of the pixel 424 with respect to other pixels 424 or an origin point. For example, the coordinates 428 may indicate that a particular pixel 424 is at an intersection of a particular row and column. The coordinates 428 may express a relative position within the two-dimensional arrangement of the optical sensor array 120(13).

In some implementations, the pixels 424 may also include color or spectral data. For example, each pixel 424 may have a plurality of light intensity values 426, with each of the light intensity values 426 indicative of an intensity of a different wavelength or range of wavelengths of light.

The sensor data 124 may include other data 430. For example, other data 430 may include information indicative of operational status of the sensor 120, error messages associated with the sensor 120, and so forth.

The processing module 328 may access the item data 136, the partition data 330, and the sensor data 124 to generate intermediate data 334. For example, the processing module 328 may access threshold data 332 and the image data 422 to generate binary image data 432.

The threshold data 332 may include a binary image threshold value used to distinguish whether a pixel 424 in the resulting binary image data 432 will be designated as a binary "0" value or binary "1" value. For example, the binary image data 432 may be generated by comparing the light intensity value 426 of each pixel 424 with a threshold value. In this example, the threshold value may be an 8-bit value of "50". The pixels 424 having light intensity value 426 below 50 may result in a pixel 424 in the binary image data 432 having a binary value of "1". In other implementations, the opposite values may be used, such as values below the threshold value being assigned a binary value of "0".

By thresholding in this fashion, the resulting binary image data 432 may be more easily processed to determine characteristics such as shape, area, perimeter, edges or contours. For example, the OpenCV function "threshold" may be used to generate the binary image data 432. In other implementations, other thresholding techniques may be used.

The processing module 328 may be configured to generate contour data using the binary image data 432. The contour data may provide information indicative of a shape having a closed or complete perimeter. In some implementations, the contour data may be indicative of a curve or open perimeter. For example, an edge appearing in the shadow 132 may be incomplete. This may occur due to an optical anomaly, erroneous reading by an optical sensor 120(7), and so forth. The processing module 328 may be configured to close an open perimeter.

The contour data may comprise the coordinates 428 of the pixels 424 within the binary image data 432 having a binary value of "1" or "0". In other implementations, the contour data may comprise a vector value, matrix of values, or other information representative of the perimeter of a shadow 132. For example, the OpenCV function "FindContours" may be used to generate the contour data. Other functions may be used to generate the contour data. For example, the OpenCV function "contourArea" may be used to process the binary image data 432 to generate the geometry data 406. The geometry data 406 may be indicated in terms of pixels 424, units of linear measurement, and so forth.

In some implementations, the binary image data 432 may be further processed to reduce noise, simplify later processing, and so forth. For example, an erosion function may be applied to the binary image data 432. In one implementation, where the contour is represented by binary "1"s, in the binary image data 432, the erosion function may be configured to set to a value of "0" those pixels 424 adjacent to, but not part of, a contour. For example, the OpenCV function "erode" may be used. In some implementations, the erosion may use a 1 pixel neighborhood boundary. Second binary image data 432 may be generated as a result of this processing, or the original binary image data 432 may be modified.

The intermediate data 334 may also comprise differential data 434. The differential data 434 may result from a comparison between image data 422 at different times and may be indicative of a change or difference when one occurs. The image data 422 may be obtained from the camera 120(1), the 3D sensor 120(2), the optical sensor array 120(13), or other sensors 120(S). For example, the differential data 434 may comprise a value indicating that the particular image data 422 has changed relative to earlier image data 422. In some implementations, the differential data 434 may simplify processing by removing "background" such as those items 104 that were left untouched. The differential data 434 may be used to determine if a change has occurred between a first time and a second time. For example, the differential data 434 may be generated using image data 422 from before and after an event.

The differential data 434 may comprise one or more differential images. In one implementation, the differential images may result from comparison of one binary image with another, one frame of image data 422 with another, and so forth. For example, a first image sensor data 124(1) may be subtracted from a second image sensor data 124(2). The subtraction may include subtracting the light intensity values 426 of a pixel 424 in the first image sensor data 124(1) from a corresponding pixel 424 at the same coordinates in the second image sensor data 124(2). The subtraction may be accomplished using the "cvSub( )" function of OpenCV.

The extent of change between the first image data 422(1) and the second image data 422(2) may be quantified by assessment of the differential image. In one implementation, pixels 424 in the differential image having a non-zero light intensity value 426 are those that exhibited a change. The pixels 424 in the differential image may be counted, a contour determined from the pixels 424, and so forth.

The processing module 328 may use the differential data 434 to determine a state of the image data 422 at a particular time. The image data 422 may be deemed to be "stable" when the number of changes for a particular period of time is below a threshold value in the threshold data 332. Similarly, the image data 422 may be deemed to be "unstable" when the number of changes for the particular period of time is greater than or equal to the threshold value. For example, the threshold value may specify a number of non-zero pixels. Continuing the example, where the threshold value is 1, differential images having one or fewer pixels 424 may be deemed to indicate a stable state of the latest image data 422 obtained. As described below, information about whether the image data 422 is in a stable or unstable state may be used to distinguish a measured interaction from noise or a spurious event.

The processing module 328 may also generate intermediate data 334 such as an interaction duration. The interaction duration may indicate a length of time the image data 422 was deemed to be in an unstable state. For example, the interaction duration may be the time elapsed between the end of a first stable state and the beginning of a second stable state. In some implementations, the processing module 328 may use an interaction threshold period stored in the threshold data 332 to prevent transient signals from generating interaction data 342. For example, the interaction threshold period may be 500 milliseconds (ms). Image data 422 for which the unstable state is greater than 500 ms may be processed and subsequently result in the generation of interaction data 342. In comparison, image data 422 having an unstable state that is less than 500 ms in duration may be disregarded as noise or a spurious event.

Intermediate data 334 may also include weight characteristic data 436. The weight characteristic data 436 may be generated by processing the weight data 126. The weight characteristic data 436 may include weight change data 438, weight distribution data 440, location of weight change data 442, or other data, such as weight at a particular instant in time.

The weight change data 438 is indicative of a change in weight measured by one or more of the weight sensors 120(6) from a first time to a second time. For example, calculation of the weight change data 438 may comprise subtracting a first weight obtained at a first time from the second weight obtained and the second time. In some implementations, the inventory management module 324 may determine the weight change data 438. In other implementations, the determination of the weight change data 438 may be performed at least partially onboard the weight sensor 120(6) or an associated device such as a controller. In some implementations, the weight change data 438 may include information indicative of noise in the weight data 126, variability of the weight data 126, estimated reliability of the weight data 126, and so forth.

The weight distribution data 440 may provide data indicative of weight distribution a particular time. The weight distribution data 440 may be expressed as a measured weight at a particular weight sensor 120(6), a ratio or percentage of weight on a weight sensor 120(6), and so forth. For example, the weight distribution data 440 may be expressed as "3213 g left, 2214 g right", "0.59 left, 0.41 right", and so forth. In some implementations, the inventory management module 324 may determine the weight distribution data 440. In other implementations, the determination of the weight distribution data 440 may be performed at least partially onboard the weight sensor 120(6) or an associated device such as a controller. In some implementations, the weight distribution data 440 may indicate a change in the weight distribution from a first time to a second time. The weight distribution data 440 may be expressed as a weight associated with one or more of the weight sensors 120(6). For example, the weight distribution data 440 for a configuration in which a rectangular shelf has a weight sensor 120(6) at each of the four corners may have weight distribution data 440 corresponding to each of the corners. In another example, data from weight sensors 120(6) may be combined, such as to provide a weight measured at a left side of the inventory location 114 and a weight measured at a right side of the inventory location 114. In some implementations, the inventory management module 324 may determine the weight distribution data 440. In other implementations, the determination of the weight distribution data 440 may be performed at least partially on board the weight sensor 120(6) or an associated device such as a controller. The weight distribution data 440 may provide data indicative of center-of-mass (COM) at a particular time. For example, the weight distribution data 440 may indicate a COM, change in the COM from a first time to a second time, and so forth.

A variety of techniques may be used to calculate the COM or center-of-gravity. The COM may be described as a point in space at which weighted position vectors relative to the point sum to zero. For example, the COM of a uniform sphere is a point in the center of the sphere. In another example, the COM of a toroid is a point in the center of the toroid. A variety of techniques may be used to calculate the COM. Consider a simple system having two masses m1 and m2, arranged along a single axis "x" at positions x1 and x2, respectively. The position of each mass is given as a distance "x" relative to an origin. The COM may be expressed by the equation:

$$x=((m1*x1)+(m2 \times 2))/(m1+m2) \qquad \text{Equation 1}$$

The physical characteristics of the inventory location 114, placement of the weight sensors 120(6) at the inventory location 114, physical position of the partitioned area 134 relative to the inventory location 114, quantity and weight of the items 104 at the respective partitioned areas 134, and so forth, may be known. For example, given the physical design of the inventory location 114, it may be known that a weight sensor 120(6) is positioned at each of the four corners of a shelf, and that the shelf has a particular length and width. Continuing the example, the physical coordinates corresponding to the partitioned area 134 on that shelf are known. Using this information, as well as the item data 136, weight characteristic data 436 may be generated for an inventory location 114 before, during, or after an interaction.

The location of weight change (LWC) data 442 provides information indicative of the location, with respect to the inventory location 114, at which a weight change has taken place. For example, the LWC data 442 may indicate that a weight change has taken place at 15 cm from the origin of the inventory location 114. The LWC 442 may be determined using the weight data 126. For example, the LWC data 442 may be calculated from the weight distribution data 440.

In some implementations, the LWC data 442 may be expressed as a vector value having a direction and a magnitude. For example, the LWC data 442 may comprise a vector having a first endpoint at an origin of the inventory location 114 and a second endpoint at the location of the weight change.

In one implementation, the LWC data 442 may be determined as follows. Assume a situation wherein the inventory location 114 comprises a shelf having a width "a", a left weight sensor located at a distance "b" from the left edge of the shelf and right weight sensor located at a distance "b" from the right edge of the shelf. The weight measured by the left weight sensor is "w1" and the weight measured by the right weight sensor is "w2". A distance "LWC" indicative of the location of weight change from an origin at the leftmost edge of the shelf may be calculated to the center-of-mass of an individual item 104 that has been added or removed in an interaction using the following equation:

$$LWC=w2*(a-2b)/(w2+w1)+b \qquad \text{Equation 2}$$

The weight change corresponding to the interaction may be calculated as:

$$\text{Total weight change}=w1+w2 \qquad \text{Equation 3}$$

During operation, the weight data 126 may be "tared" or zeroed out while the load on the platform measured by the weight sensors 120(6) is in a stable state. Subsequent changes in the weight data 126 may be used to produce the weight distribution data 440. For example, the inventory location 114 when fully loaded may have a total weight of 15 kg. The processing module 328 may "tare" these values, such that the weight is read to be "0 kg". A subsequent interaction such as a removal of two items 104 may result in a total weight change of 910 grams, with a weight distribution of 850 g on the left and 55 g on the right. Given a shelf width "a" of 1 m and the distance "b" of 0.1 m, the LWC is at 0.148 meters from the origin at the leftmost edge of the shelf.

The processing module 328 or other modules may transform the weight characteristic data 436 from one form to another. For example, the LWC data 442 may be determined using the weight distribution data 440. Similarly, the LWC data 442 may be used to derive a COM.

The inventory management module 324 may be configured to generate activity data 336, based at least in part on non-weight data 128. The activity data 336 provides information indicative of an activity, or lack thereof, at the inventory location 114. The activity data 336 may include one or more of location data 444, motion data 446, duration data 448, user identifier 450, or other data 452. In some implementations, the activity data 336 may be generated at least in part using the intermediate data 334. For example, the motion data 446 may be generated using differential data 434 obtained from a plurality of images.

The location data 444 provides information indicative of a particular position or partitioned area 134 that the activity is associated with. For example, a shadow 132 detected by an optical sensor array 120(13) beneath the partitioned area 134(1) may be processed to generate location data 444 indicative of the partitioned area 134(1). In some implementations, the location data 444 may be generated based on the physical configuration data of the facility 102. For example, given a known placement of the camera 120(1) above the partitioned area 134, and the FOV 130 of that camera 120(1) being directed toward the partitioned area 134, the image data 422 obtained from the camera 120(1) is associated with that particular location.

The motion data 446 may comprise information indicative of motion of one or more objects within the facility 102, particularly with regard to the inventory location 114, partitioned area 134, or other particular pointer area. For example, the motion data 446 may indicate that an object is approaching the inventory location 114. In one implementation, the motion data 446 may be determined at least in part by the image data 422 acquired by one or more of the cameras 120(1).

The duration data 448 provides information indicative of the duration of an activity. For example, the duration data 448 may provide information about how long the hand of the user 116 remained within the FOV 130 in the image data 422. For example, the duration data 448 may be determined based on the length of time the differential data 434 was in the unstable state.

The user identifier 450 provides information indicative of a particular user 116. For example, the user identifier 450 may comprise an account number, account name, key value, serial number, and so forth, associated with a particular user 116 or user account. The processing module 328 may be configured to determine the user identifier 450. For example, the processing module 328 may use facial recognition techniques such as available in OpenCV, Itseez, OKAO, and so forth, as described above to recognize a particular user 116 and associate the corresponding user identifier 450 with that user 116. In other implementations, the user identifier 450 may be determined by other sensors 120, such as the RFID reader 120(8) reading a tag 206 carried by the user 116.

The processing module 328 may generate interaction data 342 using the intermediate data 334, activity data 336, and so forth. The interaction data 342 may comprise information about one or more of the items 104 that may be undergoing some change in response to one or more events, such as movement from the inventory location 114 to the tote 118.

The interaction data 342 may comprise one or more of an interaction type 454, a partition identifier 414, an item identifier 402, a quantity change 456, and so forth. For example, differential data 434 such as the location of pixels 424 in a differential image produced from image data 422 may be used to determine a hand of the user 116 is moving in an area corresponding to the partitioned area 134.

The interaction type 454 may provide information about whether the interaction is determined to be a pick, place, touch, pick and place, and so forth. The processing module 328 may use the intermediate data 334 or other information such as the sensor data 124, the activity data 336, and so forth, to determine the interaction type 454. For example, weight characteristic data 436 may be generated from the weight data 126. Based on activity data 336 indicative of motion at the inventory location 114, the processing module 328 may determine that the weight data 126 is reliable. This reliable data may be used for other processing, such as determining the probabilities for the hypotheses as described above.

The partition identifier 414 may indicate the particular partition data 330 corresponding to the partitioned area 134 associated with the event. For example, the event may comprise differential data 434 indicating motion at the partitioned area 134, a change to the partitioned area 134 (such as from addition or removal of an item 104), and so forth. Using the partition identifier 414, the item identifier 402 may be determined. For example, a particular portion of the FOV 130 may be associated with a particular partitioned area 134 and the item 104 stowed thereby. As a result, changes in the image data 422 may be associated with that item identifier 402.

The item identifier 402 specifies the item 104 implicated by the interaction. For example, the item identifier 402 may indicate the item 104 that was picked, placed, touched, and so forth. In some implementations, the item identifier 402 may be determined, at least in part, by the sensor data 124.

For example, based on the differential data 434 the partition identifier 414 may be determined. From the partition identifier 414, an associated item identifier 402 may be determined. Using the known weight of the items 104 as stored in the item data 136, the weight characteristic data 436 may be used to provide information about the quantity change of the items 104.

The quantity change 456 provides information indicative of a change in the quantity of the item 104 resulting from the interaction. For example, the quantity change 456 may indicate a value of "−1" when a single item 104 is picked from the inventory location 114, or a value of "+3" when three items 104 are placed to the inventory location 114.

In one implementation, the processing module 328 may generate other information about the items 104 stowed at the inventory location 114. For example, the interaction data 342 may be analyzed to determine if a user 116 such as a person tasked with restocking the inventory location 114 is rotating stock such that old stock is brought to the front while new stock is placed behind.

In another implementation, the processing module 328 may generate information indicating that an item 104 has been misplaced in an incorrect partitioned area 134. For example, the weight characteristic data 436 may be compared to item weight data 404. Based on a mismatch between the weight characteristic data 436 and the item weight data 404, it may be determined an item 104 has been stowed in the wrong partitioned area 134.

Figure 5:
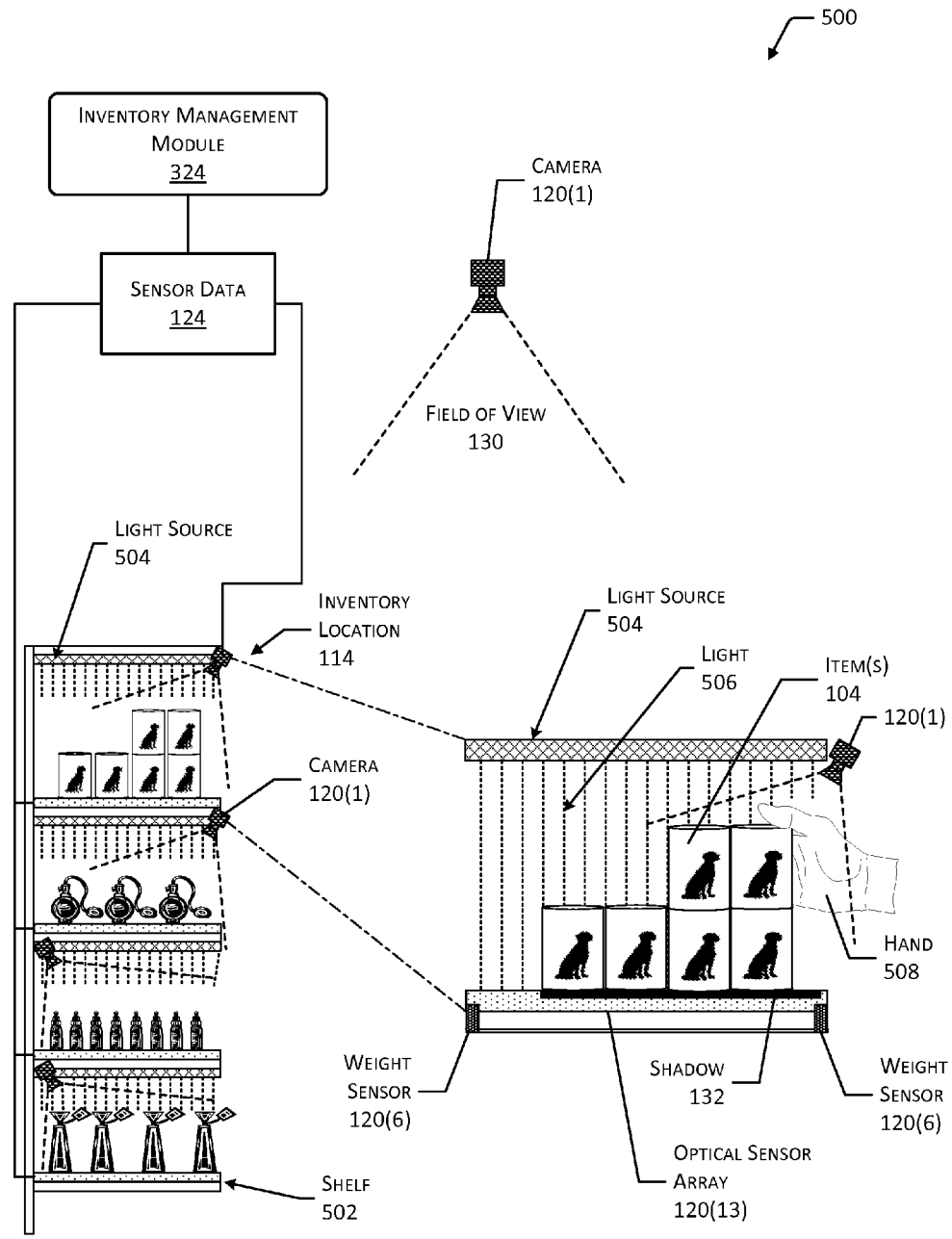
FIG. 5 illustrates a side view of an inventory location that includes various sensors, according to some implementations.

FIG. 5 illustrates a side view 500 of an inventory location 114 that includes various sensors 120, according to some implementations. In this illustration, the inventory location 114 comprises a shelf 502 on a rack.

One or more weight sensors 120(6) may be used to obtain weight data 126 from a platform, such as the shelf 502. In this illustration, the weight sensors 120(6) are arranged at the corners of the shelf 502. In another implementation, the weight sensors 120(6) may be mounted on attachment points that affix the shelf 502 to the rack. For example, the bracket supporting the shelf 502 may include a strain gauge configured for use as a weight sensor 120(6).

Above the shelf 502 may be a light source 504 configured to emit light 506. The light source 504 may comprise one or more LEDs, quantum dots, electroluminescent devices, incandescent lamps, fluorescent lamps, and so forth. The light source 504 may be configured to emit light 506 in one or more wavelengths including, but not limited to, infrared, visible, or ultraviolet. In some implementations, to reduce dazzling the eyes of the user 116, the light source 504 may be configured to emit infrared light 506.

The light source 504 emits light 506 that is detectable by at least a portion of the optical sensors 120(7) in the optical sensor array 120(13). In some implementations, the light source 504 may be located elsewhere with respect to the optical sensor array 120(13). For example, the light source 504 may comprise an overhead light fixture that provides general illumination to the inventory location 114.

The shelf 502 may incorporate the optical sensor array 120(13) as illustrated in FIG. 5. For example, the shelf 502 may comprise a structure such as a piece of glass or plastic that is transparent to the wavelengths of light 506. The items 104 may rest upon the structure, as illustrated here, or may hang above the structure, such as from a peg or arm. In some implementations, items 104 may be stacked one atop another, such as shown here with stacked cans of pet food.

As a result of the light 506 impinging upon the item 104, a shadow 132 is cast upon at least a portion of the optical sensor array 120(13). The intensity of light within the shadow 132 may be dependent upon the transparency of the item 104. For example, a clear glass bottle holding water may cast a light shadow 132, while an opaque black plastic bottle may cast a very dark shadow 132. During an interaction, the shadow 132 may also be cast, at least in part, by another object such as a hand 508 of the user 116.

The optical sensor array 120(13) is configured to provide image data 422 to the inventory management module 324. The image data 422 may then be processed by the processing module 328 to generate the interaction data 342, such as which of the partitioned areas 134 held the item 104 the user 116 interacted with.

The light source 504 may be configurable to modulate the light 506. The light 506 may be modulated such that the optical sensor array 120(13) is able to filter out or disregard other light sources 504 and obtain image data 422 based on the light 506 coming from the known position of the light source 504. Modulation of light 506 may include, but is not limited to, carrier modulation, amplitude shift keying, pulse position modulation, Manchester encoding, and so forth. The optical sensor array 120(13) may be configured to process the data from the optical sensors 120(7) to generate light intensity values 426 for the light 506 having the predetermined modulation. For example, data values associated with non-modulated light may be disregarded or filtered out.

In another implementation, operation of the light source 504 and the optical sensor array 120(13) may be time synchronized. For example, the light source 504 may be configured to emit light 506 at a particular time and for a particular duration, such as 50 ms. The optical sensor array 120(13) may be configured to acquire data from the optical sensors 120(7) while the light source 504 is emitting light 506. In some implementations, first image data 422(1) acquired while the light source 504 is active may be compared with second image data 422(2) acquired while the light source 504 is inactive. A comparison may be made between the first image data 422(1) and the second image data 422(2) to filter out or otherwise calibrate the system for ambient light.

In still another implementation, the light source 504 may be included in the optical sensor array 120(13). For example, the light sources 504 may comprise LEDs that are configured to emit light 506 toward where the item 104 may be stowed. The light 506 may be reflected from an object such as the hand 508, the item 104, and so forth. The reflected light may be detected by one or more of the optical sensors 120(7). In some implementations, the light 506 may be distributed from the light source 504 using an optical waveguide, fiber optic fibers, or other features.

In yet another implementation, the optical sensor array 120(13) may comprise a plurality of proximity sensors 120(14). The proximity sensors 120(14) may use data indicative of proximity of an object such as the item 104 to generate the image data 422. For example, an array of capacitive proximity sensors 120(14) may be used to generate the image data 422.

One or more cameras 120(1) may also be positioned at one or more of on, in the, or around the inventory location 114. For example, cameras 120(1) may be arranged such that their FOV 130 looks on a shelf 502. The cameras 120(1) may be arranged at a front edge of the inventory location 114 such as closest to the aisle 112 during operation, at the back edge of the inventory location 114, both at the front and back edges of the inventory location 114, overhead the inventory location 114, and so forth.

Figure 6:
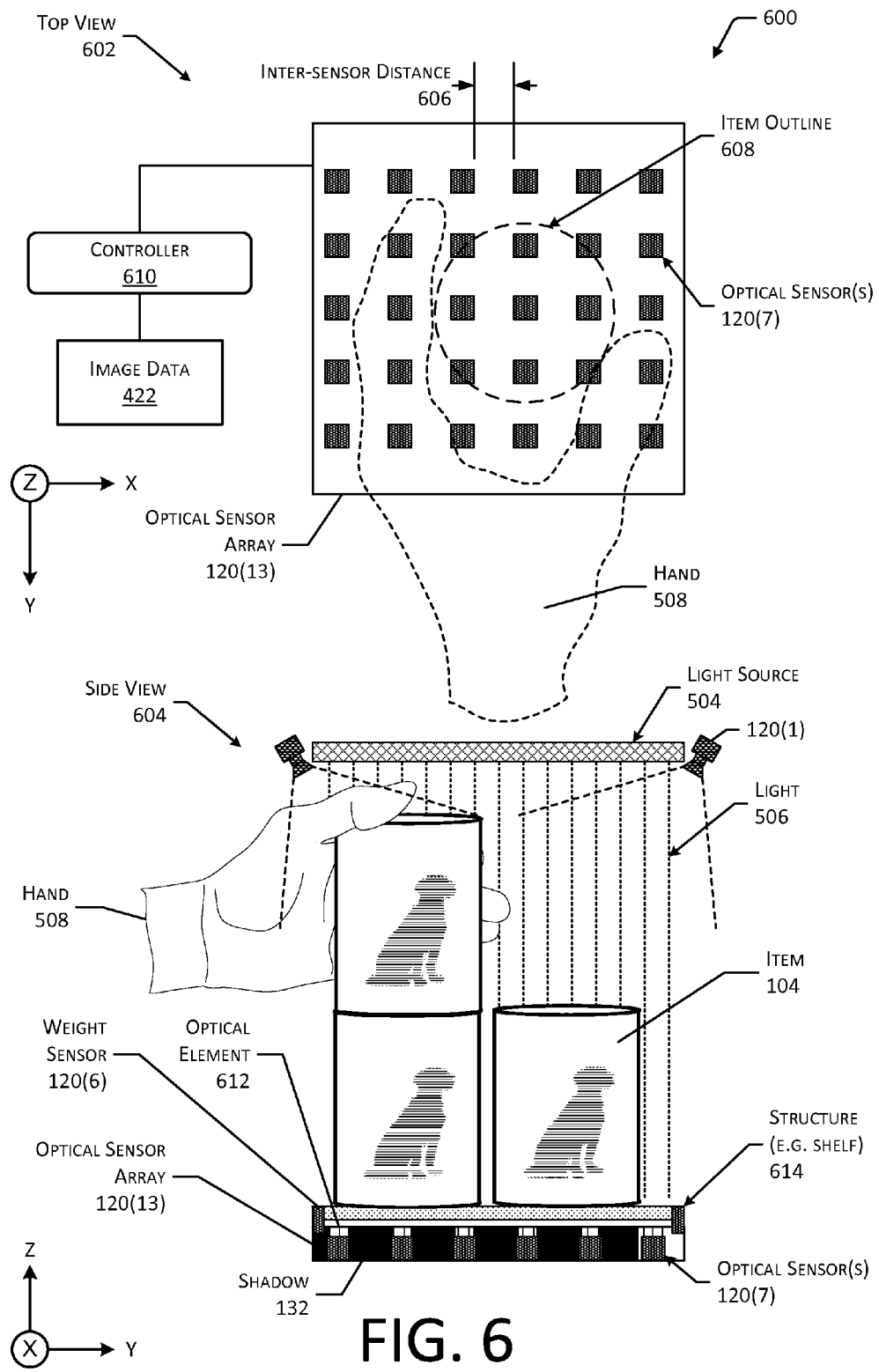
FIG. 6 illustrates enlarged top and side views of a portion of the inventory location, according to some implementations.

FIG. 6 is an illustration 600 of the optical sensor array 120(13), according to some implementations. In this illustration, a top view 602 and a side view 604 are presented.

As shown by the top view 602, the optical sensor array 120(13) may comprise a plurality of optical sensors 120(7). The optical sensors 120(7) may be arranged in a two-dimensional arrangement, such as the grid arrangement depicted here. The arrangement shown here comprises an array with an inter-sensor distance 606 that is approximately the same as measured along the X and Y axes. For example, the inter-sensor distance 606 may be at least 5 millimeters (mm) between the centers or the edges of the optical sensors 120(7). In some implementations, such as described below with regard to FIG. 8, the inter-sensor distance 606 may be representative of a distance between optical elements 612.

In other implementations, other arrangements of the optical sensors 120(7) may be used. For example, the arrangement may comprise a triangular space filling array with an optical sensor 120(7) located at each vertex.

The distribution or arrangement of the optical sensors 120(7) may be asymmetrical. In one implementation, the inter-sensor distance 606 may be varied. For example, a central region of the optical sensor array 120(13) may be sparsely populated with optical sensors 120(7) such that the inter-sensor distance 606 along the X and Y axes is greater than side regions flanking the central region. Within the side regions, the inter-sensor distance 606 may be lesser than that within the central region where the optical sensors 120(7) are sparsely populated.

For illustrative purposes, an item outline 608 of an item 104 and an outline of the hand 508 are depicted in the top view 602. The item outline 608 and corresponding shadow 132 that includes the footprint or shadow of the item 104 and the hand 508 are discussed in more detail below.

A controller 610 may be coupled to the optical sensors 120(7) of the optical sensor array 120(13). The controller 610 may comprise a microcontroller or other device configured to read out or otherwise acquire information from the optical sensors 120(7). The controller 610 may be configured to use the input from the optical sensors 120(7) to generate the image data 422. In some implementations, the controller 610 may provide the image data 422, such as a bitmap to another device such as the server 204.

The side view 604 depicts additional components of the optical sensor array 120(13). In some implementations, the optical sensors 120(7) may be optically coupled to one or more optical element 612 devices. The optical elements 612 may comprise optical waveguides, optical fibers, mirrors, lenses, or other devices configured to direct, focus, control, or distribute at least a portion of incident light 506 to one or more of the optical sensors 120(7). The optical elements 612 may be arranged in a two-dimensional arrangement, while the optical sensors 120(7) may be otherwise arranged. For example, in one implementation, the optical sensors 120(7) may be located along an edge of the optical sensor array 120(13), and the optical elements 612 may comprise optical fibers mounted and configured as an array to gather the light 506 and direct the light 506 to the optical sensors 120(7).

In some implementations, a structure 614 may provide physical support for an item 104, may protect the optical sensor array 120(13) from damage, and so forth. The structure 614 may comprise a material transmissive to the wavelengths of light 506 that are detectable by the optical sensors 120(7). For example, the structure 614 may comprise glass or plastic that is transparent or translucent. In some implementations, the structure 614 may comprise a mesh or a material with holes through which light 506 may pass.

In the implementation depicted here, the items 104 rest upon the structure 614. In other implementations, the items 104 may be supported or suspended from above the structure 614, such as from support pegs or bars. The shadow 132 may comprise the shadow 132 cast by the hanging items 104. For example, the items 104 may be hanging from a peg or a hook.

In the implementation depicted here, the optical sensor array 120(13) is located below the item 104. The optical sensors 120(7) detect light 506 from above the structure 614, such as passing through the shelf. In other implementations, the optical sensor array 120(13) may be located in other positions relative to the item 104, such as above or behind. For example, the light source 504 and the optical sensor array 120(13) depicted in FIG. 6 may be transposed, such that the light 506 beneath the structure 614 is emitted and directed upward toward the optical sensor array 120(13). The shadow 132 may then be cast by the objects between the light source 504 that is below onto the optical sensor array 120(13) that is above. In another example, the optical sensor array 120(13) may be arranged vertically, such as to the rear or one side of the partitioned area 134, to gather data about height of items 104.

One or more weight sensors 120(6) are configured to determine the weight of the load on the structure 614. For example, the weight sensors 120(6) may provide a physical coupling between the structure 614 and another portion of the inventory location 114, such as a support rib or frame. The weight sensors 120(6) may be arranged at various positions, such as proximate to the four corners of the structure 614.

Also depicted are cameras 120(1) configured to generate non-weight data 128 such as image data 422. The FOV 130 of the cameras 120(1) are configured to include at least a portion of the inventory location 114. For example, the cameras 120(1) may be mounted above the shelf 502 and configured with the FOV 130 looking down on to the shelf 502.

Figure 7:
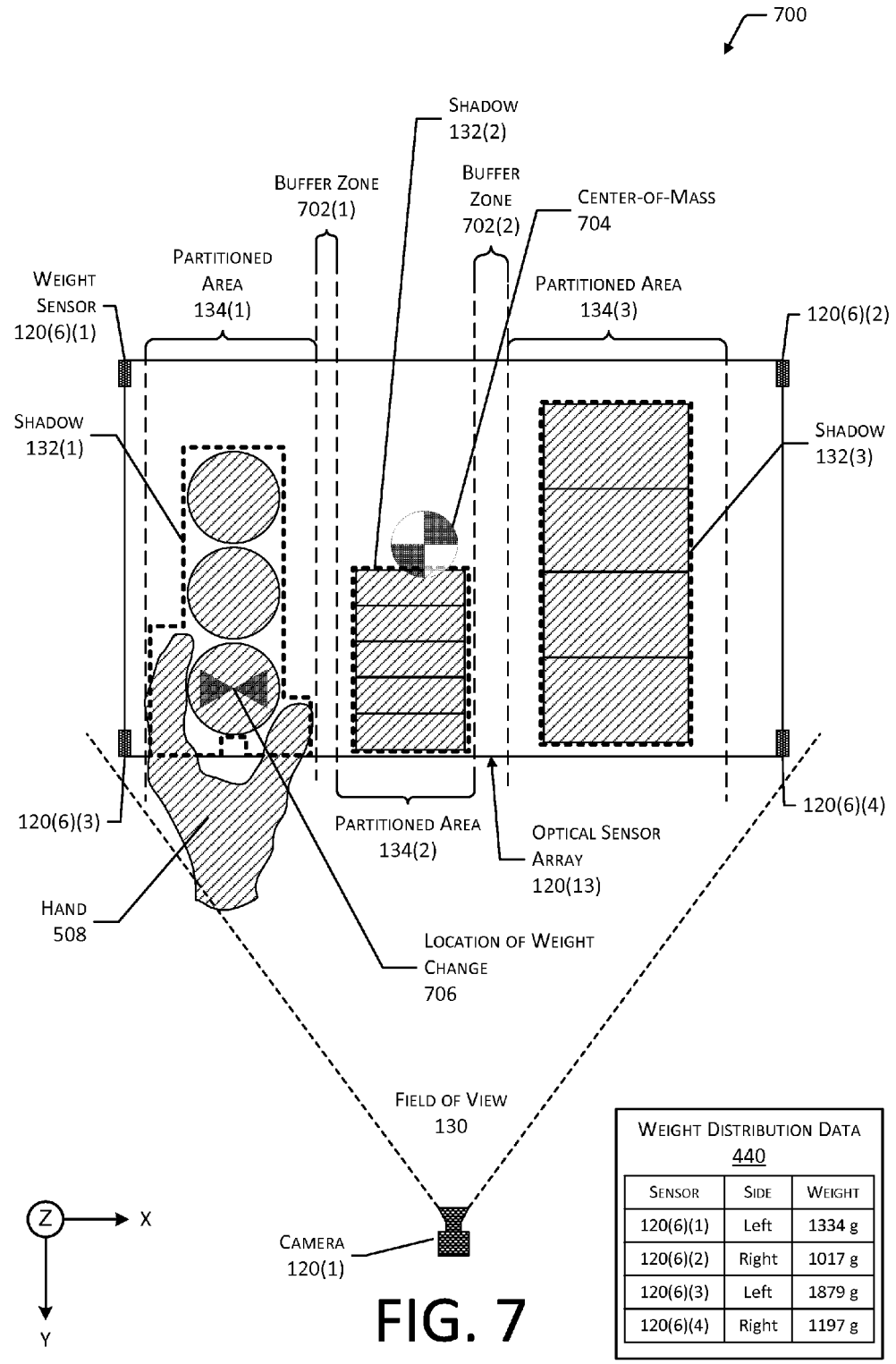
FIG. 7 illustrates an overhead view of partitioned areas at the inventory location, the shadows of objects on the partitioned area, and a weight distribution of the inventory location, according to some implementations.

FIG. 7 illustrates an overhead view 700 of partitioned areas 134 at the inventory location 114, the shadows 132 of objects on the partitioned area 134, and weight distribution of the inventory location 114, according to some implementations.

As described above, a single inventory location 114 may be used to stow or hold different items 104. The inventory location 114 may be partitioned into a plurality of partitioned areas 134. The inventory location 114 in this illustration is partitioned into a first partitioned area 134(1), a second partitioned area 134(2), and a third partitioned area 134(3). A buffer zone 702 may be provided to improve distinction between the partitioned areas 134.

As described above, partition data 330 may designate a particular portion or area of the inventory location 114 as being associated with a particular partitioned area 134. For example, the partition data 330 may describe the size and the shape of the partitioned areas 134, the position of the partitioned areas 134 with respect to the inventory location 114, and so forth.

In some implementations, the inventory location 114 may be serviced by one or more optical sensor arrays 120(13). During operation, the optical sensor array 120(13) produces image data 422. The inventory management module 324 may process the image data 422 to determine the presence of one or more shadows 132. As the user 116 reaches for an item 104 stowed at the inventory location 114 in one of the partitioned areas 134, their hand 508 casts an additional shadow 132 onto the optical sensor array 120(13). For example, as depicted here the hand 508 of the user 116 is reaching to grasp one of the items 104 stowed at the first partitioned area 134(1). As a result, a shadow 132(1) comprising the rectangular shadow 132 cast by the items 104 and the hand 508 is formed. Based on this change in the shadow 132(1), interaction data 342 may be generated that indicates an interaction is occurring at the partitioned area 134(1). Using the partition data 330, the partitioned area 134(1) may be associated with the item identifier 402 of the item 104 stowed therein.

During some interactions, the shadow 132 before and after an interaction may not change. For example, as the user 116 removes an item 104 from a top of a stack, such as an uppermost can of pet food, the shadow 132 cast by the remaining cans sitting on the shelf remains unchanged. However, the processing module 328 may be configured to detect the shadow 132 cast by the hand 508, the item 104 as it is removed, and so forth.

In other interactions, the removal of an item 104 may provide additional information to the processing module 328 that may be used to determine occurrence of an interaction. For example, first image data 422(1) may show a rectangle with an area of 12 pixels while second image data 422(2) acquired at a later time may indicate that the rectangle is now smaller with an area of 8 pixels. As a result, the interaction data 342 may indicate an interaction type 454 of a "pick". Likewise, an increase in the area of the shadow 132 may indicate an interaction type 454 of a "place", as a newly placed item 104 blocks at least some of the light 506.

In another implementation, the optical sensor array 120 (13) may be mounted to gather data about a shadow 132 of a stack of items 104. For example, the optical sensor array 120(13) may be located on a side wall or partition separating the partitioned area 134(1) from partitioned area 134(2) while the corresponding light source 504 may be arranged on the opposite side of the partitioned area 134.

Similar techniques may be used to process other image data 422, such as obtained from one or more cameras 120(1) having a FOV 130 that includes at least a portion of the inventory location 114. For example, a transformation matrix may specify a correspondence between the location of the pixels 424 in the image data 422 and the position of the partitioned area 134 on the inventory location 114. As a result, the presence of motion of an object in the image, such as a hand 508, may be determined and associated with a particular inventory location 114, partitioned area 134, or other location.

In some implementations, the processing module 328 may calculate quantity data 412 for a particular partitioned area 134. In one implementation, the calculation may use information based on the image data 422. For example, the area of a shadow 132 in the image data 422 obtained from an optical sensor array 120(13) while in a stable state (such as when no hand 508 is present) may be divided by previously stored geometry data 406 such as the area of the shadow 132 of an individual item 104, and rounding the resulting value to a nearest integer value. The integer value may then be used as the quantity data 412.

In other implementations, the processing module 328 may calculate quantity data 412 for a particular partitioned area 134 using the weight data 126. This calculation is described below in more detail.

A plurality of optical sensor arrays 120(13) may be used in conjunction with the same inventory location 114, partitioned area 134, and so forth. For example, two or more optical sensor arrays 120(13) mounted perpendicular to one another may be used to generate two sets of non-weight data 128 about the shadow of items 104. Based at least in part on the shadow 132 as expressed by the non-weight data 128, a volume occupied by objects such as the items 104, the hand 508, and so forth, may be determined. The non-weight data 128 may also be used to generate interaction data 342, to determine quantity data 412, and so forth.

As described above, the inventory location 114 may have one or more weight sensors 120(6) to generate weight data 126 about a load. For example, as depicted here, weight sensors 120(6)(1) through 120(6)(4) are arranged at each of the four corners of an inventory location 114 comprising a shelf 502. The weight sensors 120(6)(1) and 120(6)(3) are on a left side of the inventory location 114, while weight sensors 120(6)(2) and 120(6)(4) are on a right side. In other implementations, the weight sensors 120(6) may be placed at other locations on or relative to the inventory location 114. The load may include a portion of the shelf 502, other structures such as partitions, as well as the items 104.

Each item 104 has inherent physical properties such as a weight, individual center-of-mass, height, width, depth, shape, and so forth. A group or collection of items 104 that are supported by or part of a common structure have a combined weight distribution across a plurality of weight sensors 120(6). An illustration of weight distribution data 440 is depicted in a table that further indicates the side of the inventory location 114 that the weight sensor 120(6) is located on.

Individual objects have their own inherent center-of-mass (COM). Groups of item 104, such as the entire the inventory location 114 and the objects stowed therein also have a COM. Depicted in this figure is an indicia of a center-of-mass (COM) 704 for the entire inventory location 114 including the items 104 stowed thereby, hardware on the shelf, and so forth. In this illustration, the COM 704 is located within the second partitioned area 134(2). As illustrated with regard to FIG. 8, a change in the quantity or the arrangement of the items 104 may result in a change in weight distribution and the COM 704.

The COM 704 may be expressed in terms of coordinates with respect to an origin. In some implementations, the COM 704 may be determined along a single dimension, such as the width of the inventory location 114 represented by the X axis in this figure. In this implementation, the values from the weight data 126 obtained from the weight sensors 120(6) located on the left side may be summed together to provide a single "left" weight data 126, while the values from the weight data 126 obtained from the weight sensors 120(6) located on the right side may be summed together to provide a single "right" weight data 126. The COM 704 for the inventory location 114 may thus be determined using the "left" weight data 126 and the "right" weight data 126, with the position of the COM 704 expressed as a linear measurement.

Also depicted is a location of weight (LWC) change 706. The LWC 706 in this illustration corresponds to the position, with respect to the inventory location 114, of the COM 704 of the particular item 104 that the hand 508 is removing. The LWC 706 may be determined as described above with regard to FIG. 4, in particular Equation 2.

The weight data 126 may be used to generate interaction data 342 in conjunction with the non-weight data 128. For example, the probabilities of different sets of hypotheses, some based on the weight data 126 and others on the non-weight data 128, may be assessed. Continuing the example, the hypothesis with the highest probability of being true may be deemed the solution.

Figure 8:
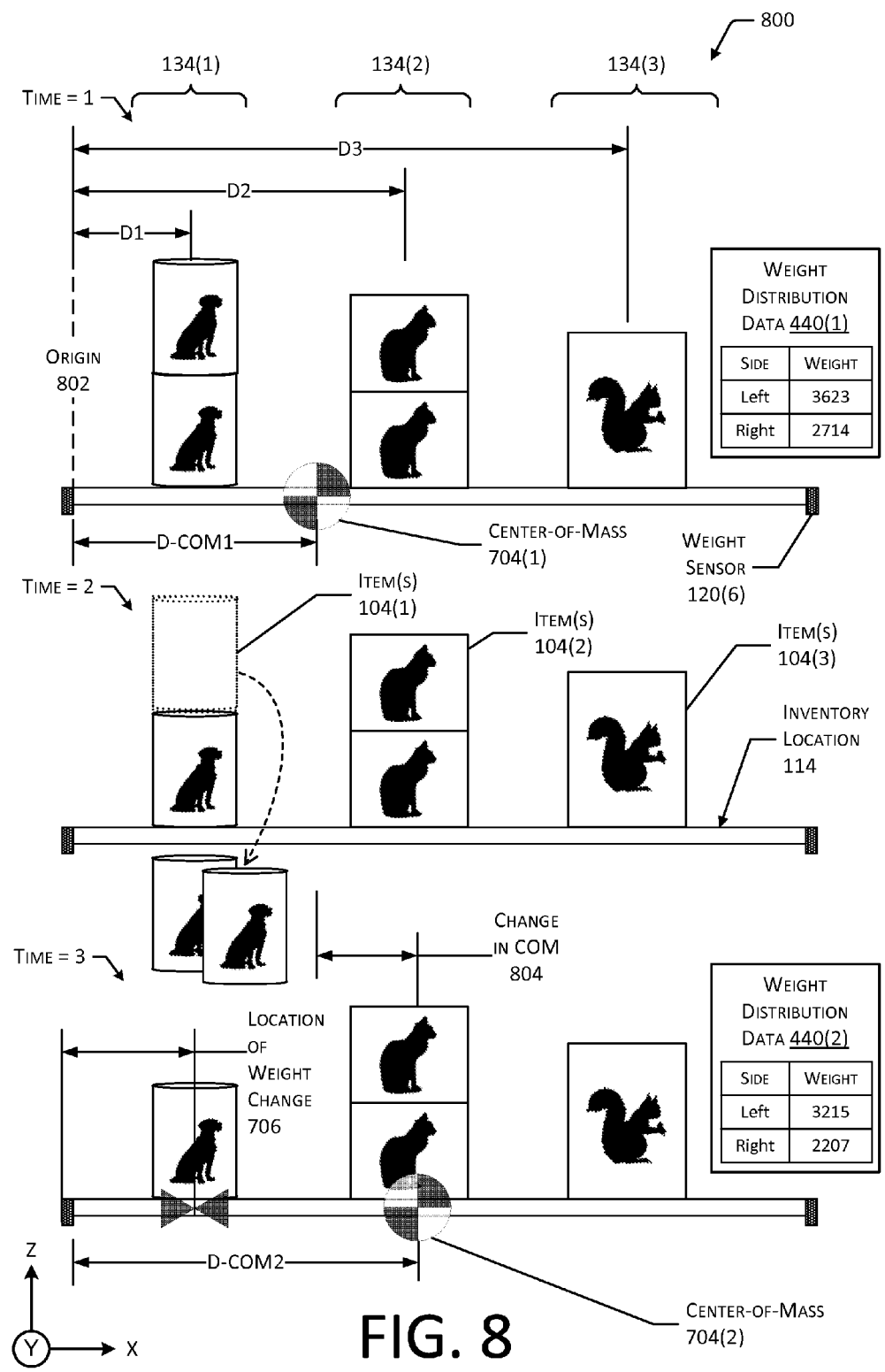
FIG. 8 illustrates a front view of the inventory location before and after removal of an item from the inventory location, according to some implementations.

FIG. 8 illustrates a front view 800 of an inventory location 114 before and after removal of an item 104 from the inventory location 114, according to some implementations.

In this illustration, a front view is provided for three different times, time=1 before an interaction, time=2 during the interaction, and time=3 after the interaction. An origin 802 is designated at the left-most edge of the inventory location 114. At the left and right edges of the inventory location 114 are weight sensors 120(6).

Depicted here are the three partitioned areas 134(1), 134(2), and 134(3) in which items 104(1), 104(2), and 104(3), respectively are arranged in the lanes. Distances from the origin 802 to the center of each of the items 104 are indicated. For example, distance D1 indicates a distance from the origin 802 to the item 104(1), distance D2 indicates a distance from the origin 802 to the item 104(2), and distance D3 indicates a distance from the origin 802 to the item 104(3).

Based on the item data 136 indicative of the quantity of each item 104, the total weight of items 104 in each of the partitioned areas 134 may be calculated. Using the total weight at each partitioned area 134 and the distance data to the respective items 104, a distance to the first COM 704(1) (D-COM1) may be calculated.

At time=1, first weight data 126(1) is obtained from the weight sensors 120(6) and used to determine D-COM1. A first weight distribution data 440(1) may be generated from the first weight data 126(1).

At time=2, a quantity of 2 of item 104(1) has been removed from the partitioned area 134(1), such as resulting from a pick by the user 116.

At time=3, after the interaction has completed, second weight data 126(2) is obtained from the weight sensors 120(6) and used to determine distance to the second COM 704(2) (D-COM2). A second weight distribution data 440(2) may be generated from the second weight data 126(2).

Location of weight change (LWC) data 442 may be generated. For example, a difference between the first weight distribution data 440(1) and the second weight distribution data 440(2) may be used to determine the LWC 706 as depicted here. Continuing the example, the difference between the weight distribution data may be used as input to Equation 2 described above.

A change in COM 804 may be determined by subtracting D-COM2 from D-COM1, or vice versa. The direction of the change in position of the COM 704 along the inventory location 114 relative to the origin 802 may be indicated by the sign of the difference. For example, a change in COM 804 having a positive sign may be indicative of a shift in the COM 704 to the left, while a negative sign may be indicative of a shift in the COM 704 to the right. The weight characteristic data 436 may include one or more of the position of the COM 704 (such as the value of the distance to the COM 704), change in COM 804 (both magnitude and direction), and so forth. Similarly, a change in weight distribution may be determined by subtracting the second weight distribution data 440(2) from the first weight distribution data 440(1).

The weight distribution data 440, location of the COM 704 relative to the inventory location 114, the LWC 706, the change in COM 804, or other weight characteristic data 436 may be used by the processing module 328 to determine interaction data 342 by selecting or discarding various hypotheses. For example, the change in weight of the inventory location 114 and the LWC 706 may be indicative of the removal of two items 104(1) from the partitioned area 134(1). The LWC 706 may be used to associate an interaction with a particular partitioned area 134 at the inventory location 114. The particular partitioned area 134 may be configured by hypotheses data based on non-weight data 128, such as image data 422 indicative of which partitioned area 132 experienced the occurrence of an event, such as the presence of the user's 116 hand 508.

As described above, various predicted may be expressed as hypotheses data 340. The hypotheses data 340 may comprise different combinations of quantities of different items 104, their respective placement within partitioned areas 134, and so forth. By assessing the probabilities that the hypotheses are true, the interaction data 342 may be determined by the inventory management system 122.

Illustrative Processes

Figure 9:
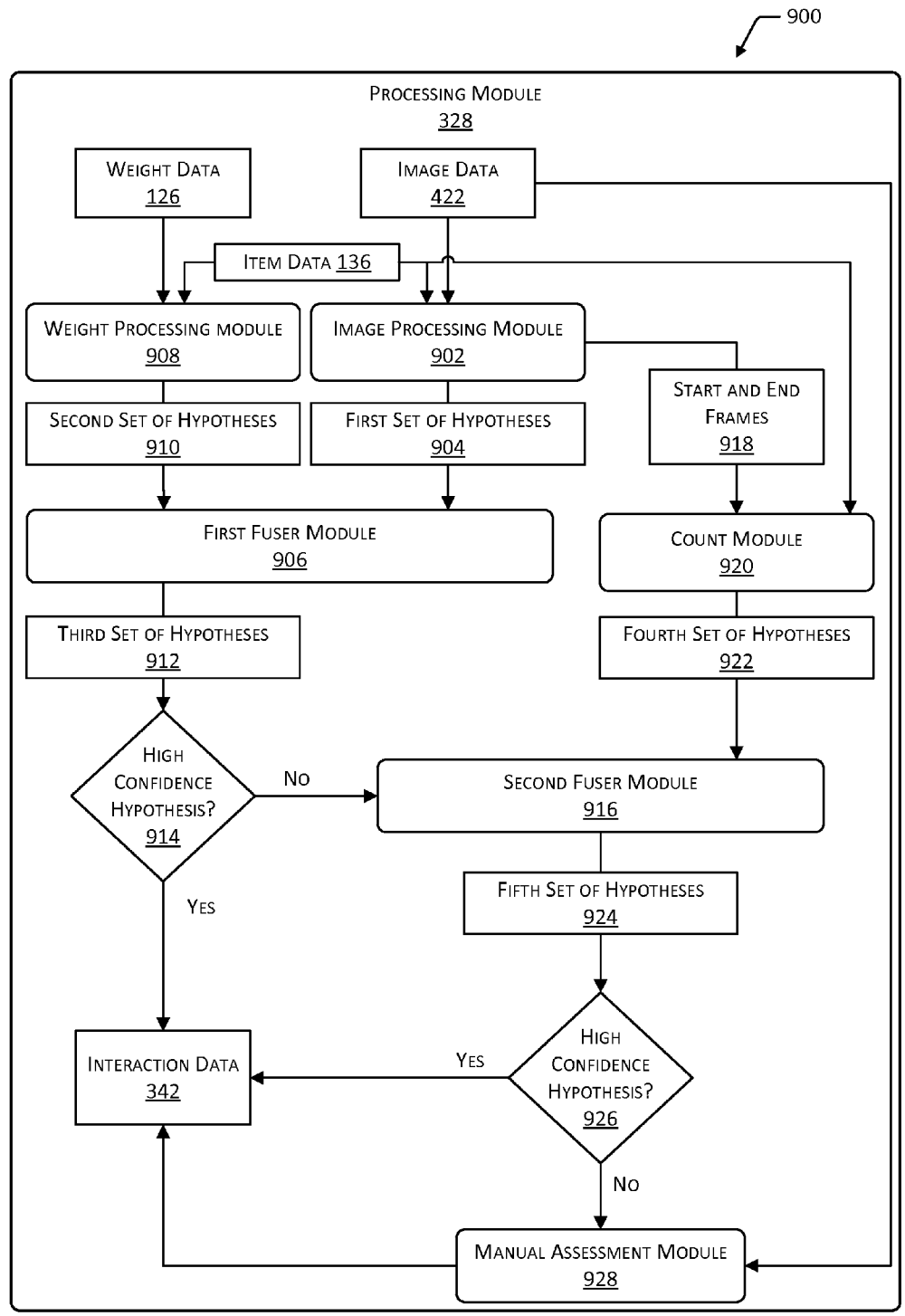
FIG. 9 depicts a flow diagram of a process for determining interaction data using different sets of hypotheses, according to some implementations.

FIG. 9 depicts a flow diagram 900 of a process for determining interaction data 342 using different sets of hypotheses, according to some implementations. In some situations, the hypotheses data 340 that is based on the sensor data 124 from a particular sensor may not exhibit a hypothesis with a confidence value sufficient to be designated as a solution. As a result, the determination of the solution may involve hypotheses data 340 for hypotheses based on one or more of different sets of sensor data 124 or sensor data 124 processed in different ways. By fusing the sensor data 124 from different types of sensors 120, interaction data 342 that is true to the measured interaction may be determined.

The process may be implemented, at least in part, by the inventory management module 324. In different implementations, one or more of the blocks described below may be omitted, the sequence of the process using these blocks may vary from that depicted, and so forth. The sensors 120 may provide information about the same portion of the facility 102, such as a particular inventory location 114.

An image processing module 902 accesses image data 422. For example, the image data 422 may comprise one or more images acquired from one or more cameras 120(1). The one or more cameras 120(1) may have a FOV 130 that covers at least a portion of an inventory location 114. For example, camera 120(1)(1) may have a FOV 130 that includes partitioned area 134(1), while camera 120(1)(2) may have a FOV that includes another partitioned area 134(1)(2), and so forth.

The image processing module 902 may use one or more image processing techniques to determine information based on the image data 422. This information may include motion data, differential data, data indicative of an item identifier 402, and so forth.

The image processing module 902 may determine motion data indicative of motion, at a partitioned area 134, of one or more objects between a group of frames of the image data 422. For example, motion detection may involve processing a group of frames by subtracting one consecutive image in the group from another, such as using the "cvSub( )" function of OpenCV. A count of the number of pixels 424 in the resulting differential images with non-zero values may be determined. If the count exceeds a threshold value, motion may be determined to have occurred between the two frames. If a sequence of counts exceeds a threshold, the group of frames may be designated as indicative of motion. In other implementations, other techniques may be used.

In another example, the motion detection may involve determining a gradient difference between pixels in consecutive frames of the image data 422. Motion in the image data 422 may be determined based on the gradient difference exceeding a threshold value.

The image processing module 902 may determine differential data indicative of items 104 that have been removed or placed at one or more of the partitioned areas 134 at the inventory location. For example, the image processing module 902 may determine if there is a difference in images at a start before and at an end after the motion. A difference between the before and after images may be indicative of a change occurring at the partitioned area 134. The change may be due to an addition or removal of an item. In some implementations, the image processing module 902 may detect indicia or markings on the surface of the partitioned area 134. For example, tracking marks, bar codes, a ruler, and so forth may be printed on the surface of the inventory location. By comparing the indicia in the start and end frames, a determination may be made as to whether items 104 have been added or removed from the partitioned area 134.

Based on the information about a particular partitioned area 134, the item data 136 may be used to determine what items 104 are stowed at that particular partitioned area 134. For example, the partitioned area 134(1) may be associated with item identifier 402 of "12345".

Using the image data 422 and the item data 136, the image processing module 902 may determine a first set of hypotheses 904. The first set of hypotheses 904 may be provided to a first fuser module 906, described below. The first set of hypotheses 904 may include one or more item identifiers 402 with associated probability values for each hypothesis. The probability values may indicate a probability that that hypothesis is true with respect to the item identifier 402 that was involved in the interaction at the inventory location 114. For example, one of the hypotheses in the first set of hypotheses 904 may indicate that a single type of item SKU #12345 was involved in the interaction, with a probability of this being true of 0.95.

In some implementations, generation of the first set of hypotheses 904 may be based upon occurrence of a triggering event. The triggering event may be the determination of the motion, determination of a change at the partitioned area 134, and so forth, as described above. For example, upon a determination of occurrence of motion, the first set of hypotheses 904 may be determined.

A weight processing module 908 is configured to access the weight data 126 and the item data 136. The weight processing module 908 may be configured to determine a second set of hypotheses 910. The second set of hypotheses 910 may include one or more of: item identifiers 402, predicted quantities for each of the one or more items 104, or probability values indicative of a probability that the hypotheses is true with respect to the interaction at the inventory location.

In some implementations, the second set of hypotheses 910 may also include predicted weight characteristic data 436. For example, the second set of hypotheses 910 may include a predicted weight distribution across a plurality of weight sensors 120(6) for the predicted quantity of the predicted item 104.

The weight processing module 908 may use the weight data 126 to determine weight characteristic data 436, and the second set of hypotheses 910 therefrom. As described above, various permutations of different quantities of those items 104 may be used to determine the second set of hypotheses 910. In some implementations, constraint data may be used to constrain the hypotheses in the second set of hypotheses 910. For example, measured weight change data 438 may be used to limit the second set of hypotheses 910 to those having predicted weight changes within a threshold range.

In some implementations, generation of the second set of hypotheses 910 may be based upon occurrence of a triggering event. For example, the weight processing module 908 may use a cumulative sum (CUSUM) technique to determine that an event is taking place at the weight sensors 120(6). Use of the CUSUM technique may help determine that a change in weight is not the result of noise or other spurious occurrences, but due to a measured change in the load upon the weight sensors 120(6). One implementation of the CUSUM technique is discussed below in more detail with regard to FIG. 12.

The first set of hypotheses 904 and the second set of hypotheses 910 may be provided to a first fuser module 906. The first fuser module 906 may be configured to produce a third set of hypotheses 912 using at least a portion of the first set of hypotheses 904 and at least a portion of the second set of hypotheses 910. In some implementations, sets of hypotheses may be combined using Bayes' rule. For example, Bayes' rule may be used to aggregate the first set of hypotheses 904 and the second set of hypotheses 910 into the third set of hypotheses 912 by computing a joint probability of the hypotheses representative of concurrent events. In other implementations other techniques may be used to join, combine, merge, or otherwise utilize the information in both of the sets of hypotheses to generate the third set of hypotheses 912.

In some situations, one or more of the sensors 120 used to determine sensor data 124 may be unavailable may produce incomplete, low quality, or unusable sensor data 124, and so forth. For example, one or more of the weight sensors 120(6) may be producing erroneous weight data 126, one or more of the cameras 120(1) may be inoperative and not be providing image data 422, and so forth.

If one set of hypotheses is empty, incorrect results may be returned if the empty set is combined with a non-empty set of hypotheses. For example, if image data 422 is unavailable, the first set of hypotheses 904 may have zero probability values. When this zero value is multiplied with a probability in the corresponding second set of hypotheses 910, each resulting hypothesis in the third set of hypotheses 912 would have a probability of zero. Various techniques may be used to address the situation where some of the sensor data 124 used by the processing module 328 is unavailable.

One technique involves the use of predetermined placeholder data which may be used in place of absent or erroneous sensor data 124. For example, when the image data 422 is unavailable, the first fuser module 906 may use a predetermined factor or function in place of the missing image data 422. The probabilities of the hypotheses in the second set of hypotheses 910 may be modified using this predetermined factor or function, and the results may be provided as the third set of hypotheses 912. Continuing the example, the predetermined factor may have a value of "0.5" and the probabilities for each of the second set of hypotheses 910 may be multiplied by the same value of "0.5". Additional thresholds may be used to determine the factor to apply. For example, where the predicted weight in the second set of hypotheses 910 is above a threshold, the factor of "0.5" may be used. Continuing the example, a factor of "0" may be used when the predicted weight is below the threshold.

Another technique involves assessing the complexity of the hypotheses provided to the fuser module. For example, a hypothesis may be deemed complex if it involves a pick and a place. In the event sensor data 124 is unavailable, the fuser module may disqualify hypotheses from inclusion in the output set of hypotheses based on the complexity. For example, the image data 422 may be unavailable to the image processing module 902 or may be of inadequate quality, resulting in an empty or incomplete first set of hypotheses 904. The second set of hypotheses 910 based on the weight data 126 may be processed to determine which hypotheses in that second set are complex or non-complex. The non-complex hypotheses of the second set of hypotheses 910 may be included in the third set of hypotheses 912 while the complex hypotheses may be omitted.

By using these techniques, the probabilities in the set of hypotheses determined by the fuser module are decreased. As the sensor data 124 becomes unavailable or is of poor quality, the output from the fuser module may be degraded, but operation of the system overall may continue. Likewise, as sensor data 124 becomes available or improves in quality, the output from the fuser module improves.

The third set of hypotheses 912 may include one or more item identifiers 402 and quantities with probability values indicative of a probability the hypothesis is true with respect to the interaction at the inventory location 114. By combining the first set of hypotheses 904 and the second set of hypotheses 910, the third set of hypotheses 912 provides for disambiguation between competing hypotheses. For example, the second set of hypotheses 910 may contain several hypotheses with similar probabilities. By combining with the first set of hypotheses 904, the situation may be disambiguated.

The third set of hypotheses 912 may be sorted and ranked according to the probability of each hypothesis. For example, the hypotheses may be sorted in descending order of probability. The ranking may result in designation of a first hypothesis having a first highest probability and the second hypothesis having a second highest probability.

The confidence value for the first hypothesis may be determined. For example, the confidence value may comprise a difference between the first highest probability and the second highest probability.

At 914, the confidence value of the first hypothesis of the third set of hypotheses 912 may be compared to a confidence threshold value. When the confidence value meets or exceeds the confidence threshold value, the first hypothesis may be designated as a "high confidence" hypothesis. The process may proceed to designate the first hypothesis as a solution, which then may be used to determine the interaction data 342.

In comparison, when at 914 the confidence value is below the confidence threshold value, the first hypothesis may be designated as a "low confidence" hypothesis. In this situation, the third set of hypotheses 912 that includes a low confidence first hypothesis may be provided to a second fuser module 916.

Returning to the image processing module 902, the image processing module 902 may produce as output start and end frames 918. The start and end frames 918 may comprise those frames that occur before and after an event, such as detection of motion within the group of images. For example, the before frame may be determined as a frame occurring prior to the detection of motion while the after frame may be determined as a frame occurring following the conclusion of the motion that was detected. The start and end frames 918 may be provided to a count module 920.

The count module 920 may be configured to use one or more machine vision counting techniques to determine a change in count of the items 104 at the partitioned area 134. For example, machine vision counting technique may be configured to identify a top portion of the items 104 as acquired from a camera 120(1) that is looking down on the shelf holding the items 104. This determination may be based on item data 136, such as previously acquired images of an exemplary item 104. Each of the tops of the type of item 104 appearing in a frame may be identified, and a count made.

In another implementation, an indicia on the inventory location 114 may be observed. For example, a ruler or other markings may be printed on the surface of the inventory location 114. Instead of, or in addition to, identifying the items, a change in the observed indicia may be determined and used to count. Continuing the example, the frame may include a portion of a ruler printed on the shelf. The length of the ruler visible in a frame may be determined. Given the length visible (or a change therein) and given information about a dimension of the type of item 104 (such as the depth), a count may be calculated.

A difference in the counts between the first image and the second image may be determined. For example, the first image may result in a count of 10 cans of pet food while the second image may result in a count of 8 cans of pet food. A hypothesis that 2 cans were removed may be determined, along with a probability that this hypothesis is accurate. The count module 920 may determine a fourth set of hypotheses 922. The fourth set of hypotheses 922 may include one or more quantities with probability values indicative of a probability that the hypothesis is true with respect to the interaction at the inventory location 114. For example, the fourth set of hypotheses 922 may indicate "quantity 2, probability 0.95".

In other implementations, the count module 920 may be configured to use other non-weight data 128 to determine the fourth set of hypotheses 922. For example, the count module 920 may receive data from an auto-facing unit or other sensor 120 at the inventory location 114. The auto-facing unit may comprise a position sensor configured to provide data indicative of displacement of a pusher. As an item 104 is removed from the auto-facing unit, the pusher moves, such as under the influence of a spring, and pushes the remaining items 104 in the auto-facing unit to the front of the inventory location 114. By using data from the position sensor, and given item data 136 such as a depth of an individual item 104, the count module 920 may determine a count based on a change in position data. For example, if each item 104 is 1 inch deep, and the position data indicates a change of 3 inches, the quantity may have changed by 3 items 104.

The second fuser module 916 uses the third set of hypotheses 912 and the fourth set of hypotheses 922 to form a fifth set of hypotheses 924. The fifth set of hypotheses 924 may include one or more item identifiers 402, the predicted quantity for each of the one or more item identifiers 402, and probability values indicative of a probability that the item identifier 402 and predicted quantity is true with respect to the interaction at the inventory location 114. Various techniques may be used to join, combine, merge, or otherwise utilize the information in both of the sets of hypotheses to generate the fifth set of hypotheses 924. For example, Bayes' rule may be used to produce joined probabilities of hypotheses from each set.

The fifth set of hypotheses 924 may be sorted in descending order of the probability for each hypothesis, and ranked. As described above, a confidence value for the first ranked hypothesis of the fifth set of hypotheses 924 may be determined. At 926, the first ranked hypothesis of the fifth set of hypotheses 924 may be compared to the confidence value threshold. When the confidence value of the first ranked hypothesis of the fifth set of hypotheses 924 meets or exceeds confidence threshold value, the first hypothesis may be designated as a "high confidence" hypothesis. The process may proceed to designate the first hypothesis as a solution, which then may be used to determine the interaction data 342.

In some implementations, at 926 a different confidence value threshold may be used, as compared to the confidence value threshold at 914. For example, the confidence value threshold used at 914 may be 0.6 while the confidence value threshold used in 926 may be 0.5.

In comparison, when at 926 the confidence value is below the confidence threshold value, the first hypothesis may be designated as a "low confidence" hypothesis. In this situation, the fifth set of hypotheses 924 may be provided to a manual assessment module 928. For example, the manual assessment module 928 may present at least a portion of the image data 422 to a human operator who may then select one or more of the hypotheses from the fifth set of hypotheses 924 as the solution or who may determine a new hypothesis.

In some implementations, temporary or interim interaction data may be determined. For example, when block 914 or 926 determines that the confidence value or another metric is below a threshold, the process may proceed contemporaneously to block interaction data 342 and also to blocks 916 or 928, respectively. This allows the process to proceed using the interim interaction data 342, reducing latency, while longer running processes such as the use of additional fuser modules are taking place. At a later time, when further information is available, such as the fifth set of hypotheses 924 or the manual input, the interim interaction data 342 may be replaced with final interaction data 342.

Returning to 914, in one implementation, the determination of the hypothesis with a low confidence value may be used to trigger the generation of the start and end frames 918, and subsequent processing by the count module 920 to determine the fourth set of hypotheses 922. This may be done to reduce computational overhead associated with the performance of the count module 920.

In another implementation, the image processing module 902 may determine the start and end frames 918 and provide them for processing to the count module 920 in parallel to the operations described above with respect blocks 902 through 914. In this implementation, the second fuser module 916 may experience a delay while waiting for the fourth set of hypotheses 922 to be provided by the count module 920.

The sets of hypotheses described herein, such as the third set of hypotheses 912, may be configured to include a default hypothesis indicative of a pick and place of an item 104 to and from the inventory location 114 but with a net change of zero. For example, this hypothesis may indicate that item 104(13) has a pick and place quantity of 0 at partitioned area 134(3). By including the default hypothesis in the set of hypotheses, spurious or no change events, such as inspection or bumping of an item 104, may be properly recognized.

While a first fuser module 906 and a second fuser module 916 are depicted, additional fuser modules (not shown) may also be utilized. For example, a third fuser module, fourth fuser module, and so forth, may be used by the system 100.

In some implementations, one or more of the fuser modules may access other data. For example, user data associated with a particular user 116 or category of user may be accessed. The user data may include one or more of pick history, place history, shopping list data, personal preference data, language preferences, food allergies, and so forth. The fuser module may utilize this data to determine probabilities associated with hypotheses, to constrain hypotheses, and so forth. For example, the first fuser module 906 may access user data indicative of the user 116 having a severe allergy to peanuts. The first fuser module 906 may assign a lower priority to hypotheses involving items 104 containing peanuts, under the assumption that the user 116 may avoid these items 104.

The fuser modules may also be configured to selectively indicate that the outputs are of low confidence. This situation may arise when hypotheses to be fused do not have explicit agreement with one another. For example, the first set of hypotheses 904 may have hypotheses associated with first item identifier 402(1), while the second set of hypotheses 910 has hypotheses associated with second item identifier 402(2). If the first item identifier 402(1) does not appear in the second set of hypotheses 910, or that second item identifier 402(2) does not appear in the first set of hypotheses 904, the resulting output in the third set of hypotheses 912 may be designated as having low confidence.

Figure 10:
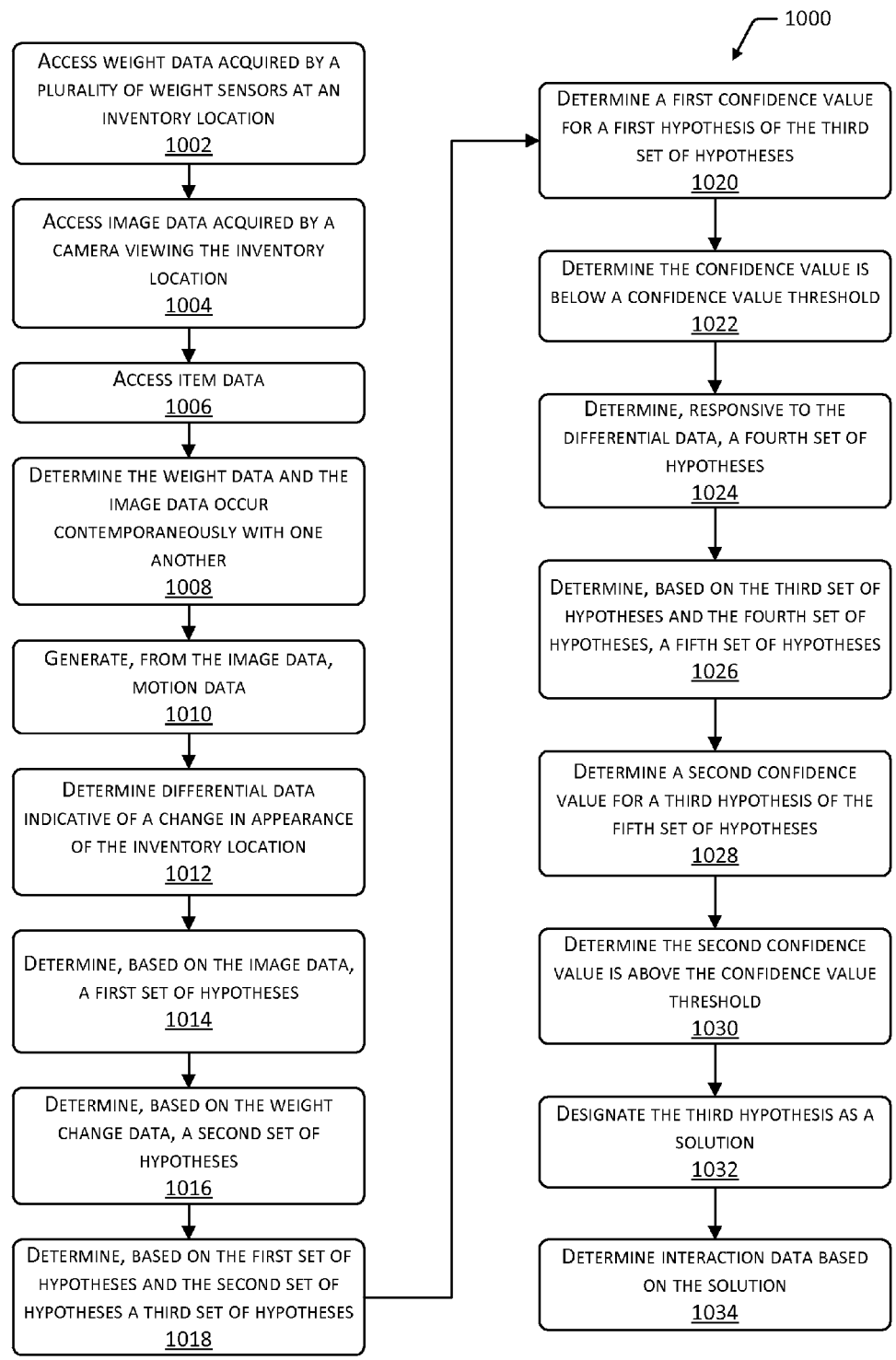
FIG. 10 depicts a flow diagram of a process for generating interaction data indicative of an interaction such as a pick or place of an item, according to some implementations.

FIG. 10 depicts a flow diagram 1000 of a process for generating interaction data 342 indicative of an interaction such as a pick or place of an item 104, according to some implementations.

The process may be implemented at least in part by the inventory management module 324. In different implementations, one or more of the blocks described below may be omitted, the sequence of the process using these blocks may vary from that depicted, and so forth. The sensors 120 may provide information about the same portion of the facility 102, such as a particular inventory location.

Block 1002 accesses weight data 126 acquired by the plurality of weight sensors 120(6) at an inventory location 114. For example, the server 202 may receive the weight data 126.

Block 1004 accesses non-weight data 128 that is associated with the inventory location 114. For example, the non-weight data 128 may comprise the image data 422 acquired by one or more of the cameras 120(1) that include a FOV 130 of at least a portion of the inventory location 114.

Block 1006 accesses item data 136. As described above, the item data 136 may comprise previously stored information such as item identifiers 402 associated with particular partitioned areas 134 at the inventory location 114.

Block 1008 determines the weight data 126 and the non-weight data 128 such as the image data 422 occur contemporaneously with one another in time and space. For example, the data may be deemed to occur contemporaneously when timestamps associated with each are within a window or threshold range of time of one another and when they share a common portion of the facility 102, such as a particular inventory location 114.

Block 1010 determines, from the non-weight data 128, motion data 446. For example, the image data 422 may be processed to determine motion within a group of frames. For example, the sequence of frames recorded by the camera 120(1) may be processed to determine motion between the consecutive frames. In another example, data from one or more proximity sensors 120(14) may be used to determine motion data 446.

Block 1012 determines, from a start frame acquired before the occurrence of motion and an end frame acquired after the occurrence of motion, differential data 434 indicative of a change in appearance of the inventory location 114. For example, the start frame may be determined as occurring before the motion determined by block 1010 while the end the frame may be determined as occurring after the motion. In one implementation, the differential data 434 may be determined by subtracting the end image from the start image or vice versa. A change in appearance may be determined when the number of pixels 424 in the differential data 434 exhibiting a difference exceeds a threshold value. Other implementations of the processing techniques may be used, such as contour detection, comparisons of changes in contour data between the start and end images, and so forth.

Block 1014 determines, based on the non-weight data 128 such as the image data 422, a first set of hypotheses 904 including one or more item identifiers 402 with probability values indicative of a probability that the item identifier 402 is true with respect to an interaction at the inventory location 114.

Block 1016 determines, based on to the weight data 126, a second set of hypotheses 910. The second set of hypotheses 910 may include one or more item identifiers 402, a predicted quantity for each of the one or more item identifiers 402, and probability values indicative of a probability that the hypothesis is true with respect to the interaction at the inventory location 114.

Block 1018 determines, based on the first set of hypotheses 904 and the second set of hypotheses 910, a third set of hypotheses 912. For example, the first fuser module 906 may determine the third set of hypotheses 912 that includes one or more item identifiers 402 and quantities with probability values indicative of a probability the hypothesis is true with respect to the interaction at the inventory location 114. In some implementations the sets of hypotheses may be combined using Bayes' rule.

Block 1020 determines a first confidence value for the first hypothesis based on a difference between the first highest probability and the second highest probability of the third set of hypotheses 912. For example, the hypotheses in the third set of hypotheses 912 may be sorted by descending order of probability and ranked to designate a first hypothesis having a first highest probability and a second hypothesis having a second highest probability.

In other implementations, instead of or in addition to the confidence value, other metrics may be determined. For example, the value of the probability of the respective hypotheses may be used instead of the confidence value.

Block 1022 determines the confidence value of the first hypothesis is below a confidence value threshold. For example, the probabilities for the first hypothesis and the second hypothesis may be relatively close to one another, resulting in a potential ambiguity between hypotheses and the measured interaction.

In some implementations, instead of or in addition to a determination using the confidence value, other metrics or input may be used to determine how accurately the first hypothesis corresponds to an actual situation. For example, the probability of the first hypothesis as described above may be determined to be below a threshold value.

Block 1024 determines, responsive to one or more of the motion data or the differential data 434, and based on the start frame and the end frame 918, a fourth set of hypotheses 922. The fourth set of hypotheses 922 may include one or more quantities with probability values indicative of a probability that the hypothesis is true with respect to the interaction at the inventory location 114. For example, the count module 920 may determine the fourth set of hypotheses 922.

Block 1026 determines, based on the third set of hypotheses 912 and the fourth set of hypotheses 922, a fifth set of hypotheses 924. The fifth set of hypotheses 924 may include one or more item identifiers 402, the predicted quantity for each of the one or more item identifiers 402, and probability values indicative of a probability that the item identifier 402 and predicted quantity is true with respect to the interaction at the inventory location 114.

Block 1028 determines a second confidence value for a third hypothesis of the fifth set of hypotheses 924. The hypotheses of the fifth set of hypotheses 924 may be sorted in descending order of probability and the top two hypotheses may be designated. For example, the third hypotheses may be the first ranked hypothesis of the fifth set of hypotheses 924 and have the first highest probability for that set. In comparison, a fourth hypothesis may be a second ranked hypothesis of the fifth set of hypotheses 924 and have a second highest probability for that set.

Block 1030 determines the second confidence value is at or above a confidence value threshold. In some implementations, the confidence value threshold used to compare the second confidence value may differ from the confidence value threshold used to compare the first confidence value.

Block 1032 designates the third hypothesis as a solution. Continuing the example, given the second confidence value exceeding the confidence value threshold, the third hypothesis is deemed to have a probability of truth that is sufficiently high.

Block 1034 determines, based on the solution, interaction data 342. The interaction data 342 may be indicative of one or more of a change in quantity of the one or more items 104 resulting from the interaction, an item identifier 402 indicative of the one or more items 104 involved in the interaction, data indicative of the partitioned area 134 at which the one or more of the items 104 were picked or placed, and so forth.

In some implementations, messages or other mechanisms may be used to coordinate the different activities associated with processing the sensor data 124. This coordination may involve waiting for additional sensor data 124 to complete acquisition. For example, the weight data 126 may be determined in under a second, while the non-weight data 128 such as the image data 422 may require several seconds for acquisition.

A first message may be received from the weight sensors 120(6) indicative of a change in state, such as from a stable to an unstable condition, or vice versa. This message indicates that an event may be taking place that may provide data useful to the system. A second message may be received from the camera 120(1) or other non-weight sensor indicative of a change. For example, the camera 120(1) may have onboard motion detection processing and may provide a message indicative of a change between two or more consecutive frames.

These messages may be used to alert one or more of the modules of the inventory management module 324 that additional data may be forthcoming. For example, the first fuser module 906, the second fuser module 916, and so forth, may be configured to wait to process data until they have received the sensor data 124 that is expected.

A third message may be received from the weight sensors 120(6) indicative of the change concluding. For example, the weight sensor 120(6) may determine that no changes have taken place in the measured weight for a threshold amount of time and may then determine third message.

A fourth message may be received from the non-weight sensors 120 such as the camera 120(1), indicative of the change concluding. For example, the onboard motion detection processing of the camera 120(1) may indicate that no further changes have been observed between consecutive frames and determine the fourth message.

These messages, or data indicative of them, may be provided to the respective modules within the processing module 328 for further use. For example, one or more of the first fuser module 906 or the second fuser module 916 may be configured to wait to determine their respective sets of hypotheses until they receive the third and fourth messages indicating that changes measured by the respective sensors 120 have concluded. By providing for this additional information, the inventory management module 324 may avoid inadvertently processing data before a transaction is concluded. Should the concluding message (such as the third and fourth messages) never be received, the process may time out. After timing out, the fuser module may continue to process the sensor data 124 that is available. Should a time out occur during processing, the solution associated with that time out may be designated as a low confidence event.

In some implementations, the messages may be determined by one or more other modules. For example, the image processing module 902, the weight processing module 908, and so forth, may determine the messages.

In some situations, messages may be subject to a timeout window. For example, if the third or fourth message indicating that changes are concluded are not received within a threshold amount of time, the processing of the previously received sensor data 124 may proceed.

Figure 11:
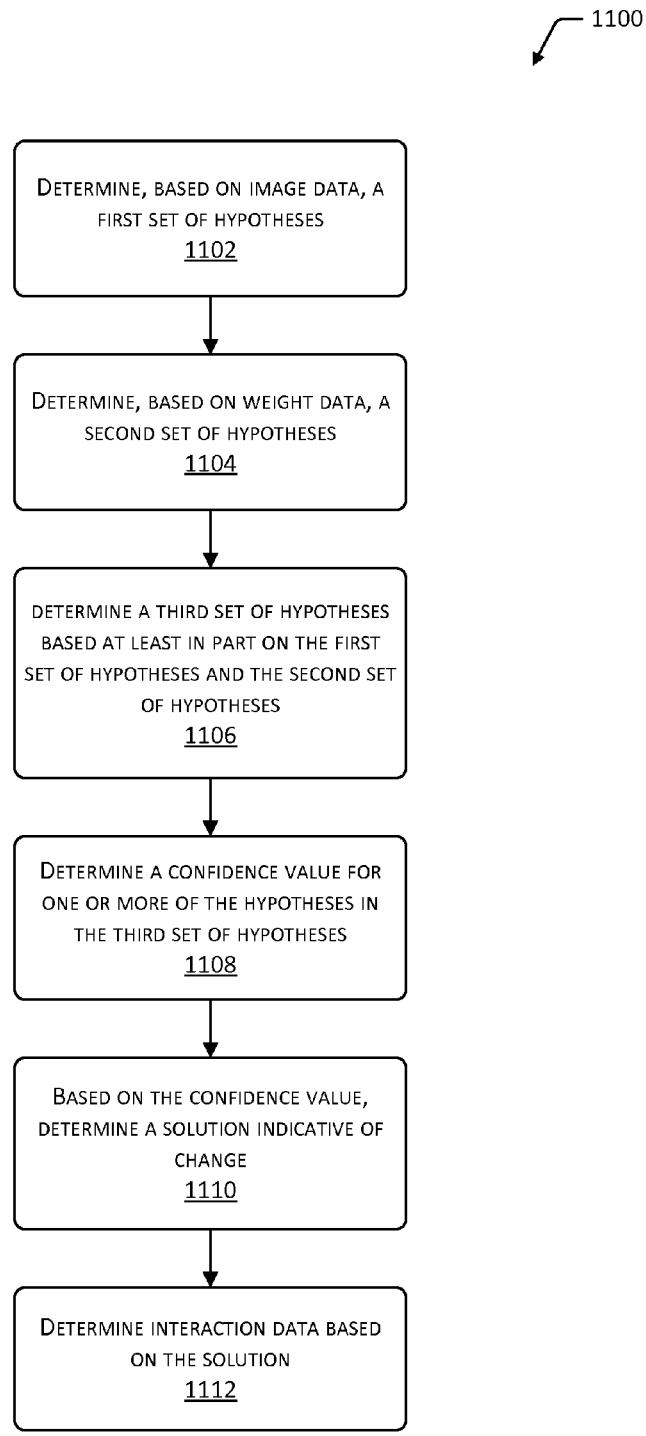
FIG. 11 depicts a flow diagram of another process for generating interaction data, according to some implementations.

FIG. 11 depicts a flow diagram 1100 of another process for generating interaction data 342, according to some implementations. The process may be implemented at least in part by the inventory management module 324. In different implementations, one or more of the blocks described below may be omitted, the sequence of the process using these blocks may vary from that depicted, and so forth. The sensors 120 may provide information about the same portion of the facility 102, such as a particular inventory location 114.

Block 1102 determines, based on non-weight data 128, a first set of hypotheses. For example, image data 422 acquired from a camera 120(1) viewing the inventory location 114 may be accessed. The image data 422 may be processed by the image processing module 902 to determine the first set of hypothesis 904. The item data 136 indicative of placement of one or more items 104 at one or more partitioned areas 134 of the inventory location 114 may also be accessed and used by the image processing module 902. In some implementations, each hypothesis in this set may be indicative of a probability that a particular item identifier 402 was involved in an interaction.

Block 1104 determines, based on the weight data 126, a second set of hypotheses. For example, the weight data 126 from a plurality of weight sensors 120(6) at an inventory location 114 may be accessed. The item data 136 indicative of weight of one or more items 104 and their placement at one or more partitioned areas 134 of the inventory location 114 may also be accessed and used by the weight processing module 908. The weight data 126 may be processed by the weight processing module 908 to determine the second set of hypotheses 910. In some implementations, each hypothesis in this set may be indicative of a probability that a particular quantity of a particular item 104 was involved in the interaction.

In some implementations, the second set of hypotheses 910 may be based on one or more constraints. For example, a block (not shown) determines a measured change in weight at the inventory location 114. Another block determines a measured weight distribution of the inventory location 114. One or more hypotheses may be determined, in which each hypothesis comprises data indicative of: predicted quantity of the particular item 104, a predicted change in weight, and a predicted weight distribution. A subset of the one or more hypotheses may be determined as the second set of hypotheses 910 based at least in part on one or more of the measured change in weight or the measured weight distribution. For example, the second set of hypotheses 910 may be restricted to hypotheses that have a predicted weight change that is within a threshold value of the measured weight change.

In some implementations, the weight data 126 and the non-weight data 128 that are used to determine sets of hypotheses may be selected such that portions thereof are determined to have occurred contemporaneously in time and space with one another prior. For example, at least a portion of the sensor data 124 may have timestamps, sequence numbers, or other indicia that may be used to specify an interval of time or commonality of occurrence. The contemporaneous occurrence may include simultaneous occurrences or those within a threshold time of one another. For example, the weight data 126 and the non-weight data 128 having timestamps within a threshold window of 150 ms may be deemed to be contemporaneous with one another. To determine whether the data are spatially contemporaneous, physical configuration data such as indicating what sensors 120 gather information for what portions of the facility 102 may be used.

Block 1106 determines a third set of hypotheses 912 based at least in part on at least a portion of the first set of hypotheses 904 and at least a portion of the second set of hypotheses 910. For example, Bayes' rule may be used to aggregate the first set of hypotheses 904 and the second set of hypotheses 910 by computing a joint probability of the hypotheses representative of concurrent events.

In some implementations, an occurrence of motion at the inventory location 114 may be determined. The detection of motion may be based changes between a plurality of images in the image data 422. Changes between successive images may be indicative of motion of an object within the FOV 130 of the camera 120(1) that acquired the images. A determination of one or more of cessation of motion in the image data 422 or that a maximum wait time has been reached may be made. The generation of the third set of hypotheses 912 may be responsive to the cessation.

One or more additional hypotheses may be inserted to or injected into the third set of hypotheses 912. For example, a default hypothesis indicative of a pick and place of an item 104 to and from the same inventory location 114 with a zero net change of item quantity may be inserted. Insertion of this default hypothesis may improve overall system performance by avoiding incorrect determinations of hypotheses that may result from interactions such as bumping or touching an item 104. A probability that this default hypothesis is true may also be calculated and included in the ranking and analyses of the hypothesis as described above.

Block 1108 determines a confidence value for one or more of the hypotheses in the third set of hypotheses 912. For example, the confidence value may be calculated by subtracting a probability of a second ranked hypothesis from a probability of a first ranked hypothesis in the third set of hypotheses 912.

Based on the confidence value, block 1110 determines a solution indicative of a quantity of items 104 that changed at the inventory location 114. For example, when the confidence value of a hypothesis meets or exceeds confidence value thresholds, that hypothesis may be designated as the solution.

As described above, in some situations the probabilities of various hypotheses in the set of hypotheses may be insufficient to reach or exceed the confidence value threshold. In these situations, additional hypotheses may be determined using sensor data 124 acquired from other sensors 120 or from sensor data 124 that has been processed in a different fashion. These additional hypotheses may be combined with one or more previously determined sets of hypotheses to determine a high confidence hypothesis that may be designated as a solution.

For example, a block (not shown) may determine, from the image data 422, data indicative of occurrence of motion at the inventory location 114 as recorded by a group of frames. From this group of frames, a start frame before the group of frames and an end frame after the group of frames may be determined. The start and end frames 918 may then be used to determine differential data 434 indicative of a change in appearance of the inventory location 114. The motion may indicate that some event is taking place at the partitioned area 134, while the differential data 434 provides more information about whether that event involved adding or removing items 104.

Continuing the example, a fourth set of hypotheses 922 may be determined using the start and end frames 918. The fourth set of hypotheses 922 may include one or more quantities with probability values. The probability values are indicative of a probability that the quantity in the hypothesis was one or more of: added to or removed from the inventory location 114, or a portion thereof, such as the partitioned area 134. The fourth set of hypotheses 922 may be combined by the second fuser module 916 with one or more previously determined sets of hypotheses.

In one implementation, the fourth set of hypotheses 922 may be determined by the count module 920. The count module 920 may be configured to use the start and end frames 918 to count the number of items 104 appearing in the images. For example, the count module 920 may count a start number of item tops, sides, bottoms, or other features appearing in the start frame. The count module 920 may also count an end number of the features, such as item tops, appearing in the end frame. The count module 920 may determine a quantity of the items 104 that was one or more of added to or removed from the partitioned area 134 by subtracting the start number from the end number. The count module 920 may use the determined quantity to determine a hypothesis. This hypothesis may include a probability indicative of whether the hypothesis is true.

Block 1112 determines interaction data 342 based at least in part on the solution. For example, the predicted values present in the hypothesis designated as a solution may be used as measured values indicative of the interaction.

Another block (not shown) may use the information in the interaction data 342 to change item data 136. For example, the predicted values present in the hypothesis may be used to change data indicative of a quantity on hand of the item 104 at the partitioned area 134 of the inventory location 114.

Figure 12:
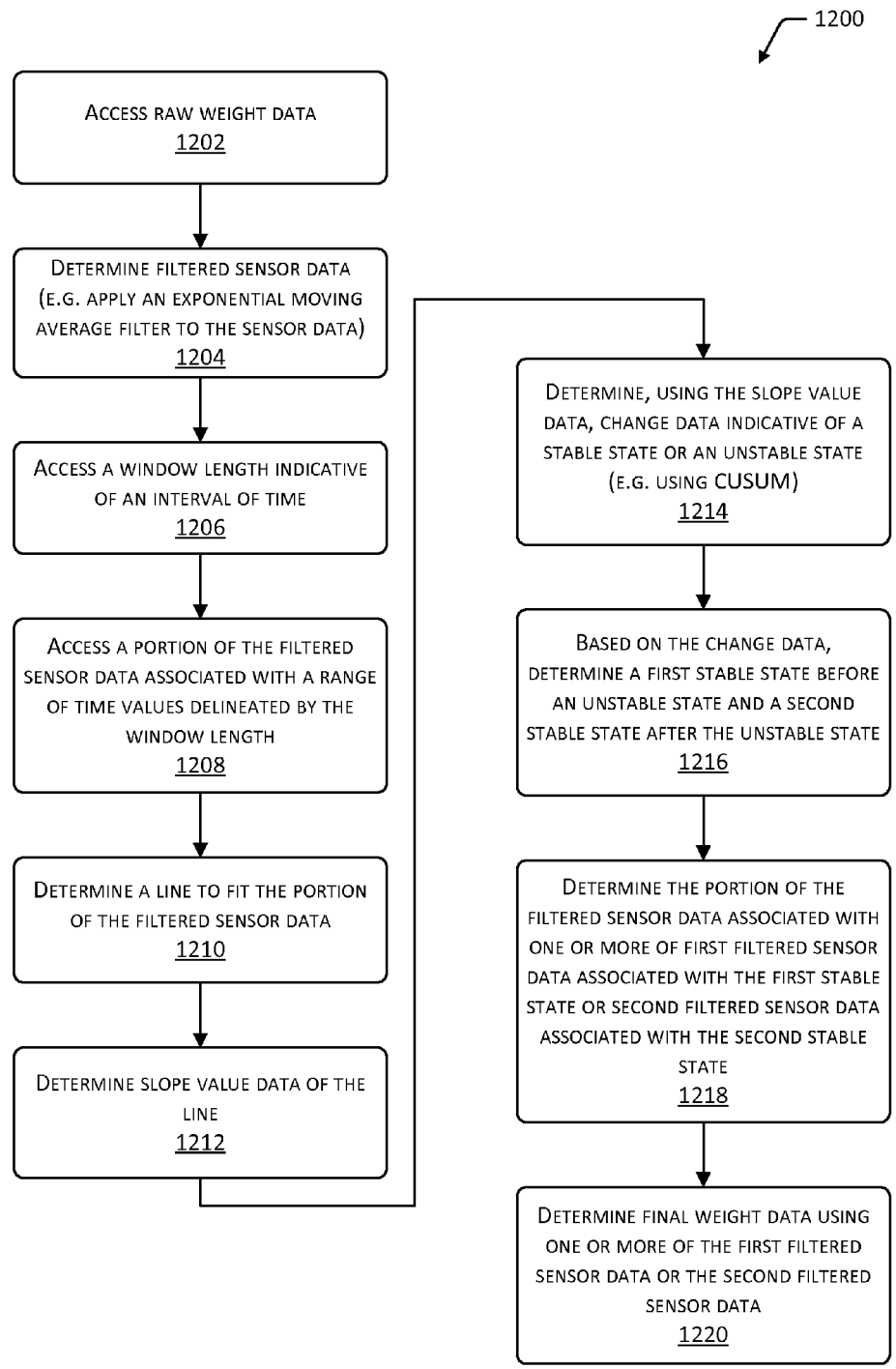
FIG. 12 depicts a flow diagram of a process of generating weight data, according to some implementations.

FIG. 12 depicts a flow diagram 1200 of a process of generating weight data 126, according to some implementations. In some implementations, the process may be performed at least in part by weight processing module 908, or by a processor at the inventory location 114 and coupled to the weight sensor 120(6).

Block 1202 accesses the "raw" weight data 126 from the weight sensors 120(6). In some implementations, the raw weight data 126 may have some pre-processing applied.

Block 1204 determines filtered sensor data from the raw weight data 126. For example, a filter module may process the raw weight data 126 using an exponential moving average function.

Block 1206 accesses a window length indicative of an interval of time. For example, the window length may be specified by configuration data. In some implementations, the window length may be between at least 400 milliseconds and at most 600 milliseconds. For example, the window length may be about 500 ms. In implementations where the weight data 126, the filtered sensor data, or both are expressed in terms of individual samples, frames, or other discrete data elements, window length may be specified in terms of a number of those discrete data elements. For example, window length may be specified as 15 samples.

Block 1208 accesses a portion of the filtered sensor data associated with a range of time values delineated by the window length. Continuing the example above, the 15 most recent samples may be accessed.

Block 1210 determines a line based on the filtered sensor data occurring within the window length. For example, a slope module may fit a line to the filtered sensor data using a linear regression function. Continuing the example, the linear regression function may comprise a least square regression function.

Block 1212 determines slope value data of the line. Continuing the example, the slope module may calculate the slope of the line and provide that output as the slope value data. As described above, the slope value data may be visualized as being indicative of a change in rise over a run of the line, or how "steep" the line is.

Block 1214 determines change data associated with the slope value data. For example, an alarm module may determine alarm data which is then processed by a change detector module to determine the change data. In some implementations, the alarm module may implement a cumulative sum (CUSUM) function. The CUSUM function is a sequential analysis technique originally developed by E.S. Page. The CUSUM function may be configured to analyze changes to a plurality of slope values over time. One implementation of the alarm function using a variant of the CUSUM function is described below with regard to Code Implementation 1.

Code Implementation 1

""""Runs cusum on a scalar value and alarms if there are changes.""""
from abc_alarm_algorithm import AlarmAlgorithm
from abc_alarm_algorithm import AlarmEventType
import abc_metrics
class ScalarCusumAlgorithm(AlarmAlgorithm):
  """"An implementation of cumulative sum alarming.
  Takes in a signal estimate and raw signal and maintains positive and negative residuals. Alarms if the residuals cross a threshold.
    NOTE: Does not maintain the signal estimate.
    A note about the H and V design parameters:
    H:
    If the cumulative sum of the positive or negative residual (delta of the raw signal and signal estimate) exceeds this value, an alarm is raised and the cumulative sums are reset. This is related to the noise of the system and what the operator wants to be defined as a change.
    A good value to start with is 100. If too many changes are detected or the system is constantly unstable, try doubling until a reasonable output is obtained.
    To get more changes, lower this value. To get fewer changes, raise this value.
    V:
    At each new residual, this value is subtracted from the positive and negative residual. This value is used to account for drift in the system that could cause false cusum alarms. A good value to start with is 5. If constantly unstable or seeing slow events cause changes try raising this value. If not seeing any changes try lowering this value.
    """"
    def _init_(self,
      H,
      V,
      name="ScalarCusumAlgorithm",
      unpack_method=None,
      pack_method=None):
      """"Initializes the algorithm.
      keyword parameters:
      H—The H design parameter as a float.
      V—The V design parameter as a float.
      name—The name to initialize the alarm algorithm with as a string. (Default ScalarCusumAlgorithm). Can be used as a tag.
      unpack_method—Optional method used to reformat inbound data, called before anything else in on next( ). (Default None)
      pack_method—Optional method used to reformat outbound data, called before publishing in on next( ). (Default None)
      """"
      super(ScalarCusumAlgorithm, self)._init_(name, unpack_method, pack_method)
      self._h_param=H
      self._v_param=V
      #check for a stable signal and force sums to 0
      residuals crossed zero=self._cusum_pos<0. and self._cusum_neg<0.
      if self._cusum_pos<0.:
        self._cusum_pos=0.
      if self._cusum_neg<0.:
        self._cusum_neg=0.
      #notify stable if crossed 0
      if residuals crossed zero:
        return AlarmEventType.Signal Estimate Stable
      #alarm and reset if over threshold
      elif    self._cusum_pos>self._h_param    or    \
        self._cusum_neg>self._h_param:
        self.last_cusum_pos_spike=self._cusum_pos
        self.last_cusum_neg_spike=self._cusum_neg
        self._cusum_pos=0.
        self._cusum_neg=0.
        return AlarmEventType.Alarm_Occurred
      #otherwise nothing happened
      else:
        return AlarmEventType.No_Event
    def reset_h(self, new_h):
      """"Resets the H design parameter to the value passed in.
      keyword parameters:
      new_h—The new h design parameter to use.
      """"
      self._h_param=new_h
    def reset_v(self, new_v):
      """"Resets the v design parameter to the value passed in.
      keyword parameters:
      new_v—The new v design parameter to use.
      """"
      self._v_param=new_v
    def reset cusum(self):
      """"Resets both cusum values to 0.""""
      self._cusum_pos=0
      self._cusum_neg=0

The change data is indicative of one of stability or instability of the filtered sensor data within the interval of time specified by the window length. The filtered sensor data may be deemed to be stable when values of the filtered sensor data are unchanging or less than a threshold value during the interval of time. For example, where the values of the filtered sensor data are within 5% of a median value, they may be designated as stable. The filtered sensor data may be deemed to be unstable when variance of the values exceeds the threshold value during the interval of time. For example, where a second value at an end of the interval of time varies by more than 5% from a first value at a beginning of the interval of time, the filtered sensor data may be unstable. During periods of instability, the values in the filtered sensor data may be unreliable. For example, the unstable values may be the result of mechanical motion while a platform of the inventory location 114 oscillates during settling. Use of the filtered sensor data acquired during an unstable time may result in incorrect weight data 126. Stated another way, the stable state may correspond to stable output by the weight sensor 120(6) (such as while settled), while the unstable state may correspond to unstable output by the weight sensor 120(6) (such as during or immediately after a perturbation). By using the filtered sensor data acquired during a stable interval of time, the accuracy of the weight data 126 used for subsequent processing is improved. By utilizing the change data, the weight processing module may be able to more quickly determine weight data 126 without having to wait for a lengthy settling time.

Based on the change data, a first stable state occurring before an unstable state is determined. Also determined based on the change data is a second stable state after the unstable state.

Block 1216, based on the change data, determines a first stable state before an unstable state and a second stable state after the unstable state. The transition from stable to unstable and back to stable may be deemed indicative of an event or other activity at the inventory location 114.

Block 1218 determines the portion of the filtered sensor data associated with one or more of a first filtered sensor data associated with the first stable state or second filtered sensor data associated with the second stable state. For example, the change data may be associated with the filtered sensor data using a time value. In some implementations, the association may be made using the last time value appearing within the range of time values corresponding to the respective state. For example, the time value of the last sample in the window length may be used.

Block 1220 determines final weight data 126. For example, the final weight data 126 may comprise a weight difference indicative of a change in the weight from the first filtered sensor data to the second filtered sensor data. In another example, the weight data 126 may comprise the second filtered sensor data indicating the weight after return to a stable state.

The process 1200 in some implementations may be iterated. For example, as additional samples of weight data 126 are determined and accessed, they may be included into the interval of time specified by the window length, while oldest samples may be dropped. Continuing the example, the window of time specified by the window length may "move forward" such that new samples of weight data 126 are added and oldest entry samples are discarded from the window of time.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a shelf to hold a first type of item in a first partitioned area and a second type of item in a second partitioned area;
   a plurality of weight sensors, each of the plurality of weight sensors positioned at the shelf at a different point;
   a camera with a field-of-view that includes at least a portion of the shelf; and
   a computing device comprising:
      a memory, storing computer-executable instructions; and a hardware processor to execute the computer-executable instructions to:

determine that an interaction has been detected involving at least one of the first type of item and the second type of item on the shelf;

responsive to determining that the interaction has been detected, identify that weight data and image data describing the interaction are available, wherein the weight data is acquired by the plurality of weight sensors and the image data is acquired by the camera;

receive the weight data acquired by the plurality of weight sensors;

receive the image data acquired by the camera, wherein the weight data and the image data are acquired contemporaneously with one another;

access item data indicative of item identifiers associated with respective ones of the first partitioned area and the second partitioned area;

generate, from the image data, motion data indicative of an occurrence of motion at the shelf;

determine, from the image data, a start frame acquired before the motion and an end frame acquired after the motion;

generate, from the start frame and the end frame, data indicative of a change in appearance of the shelf;

determine, based on the image data, a first set of hypotheses for the interaction, each hypothesis of the first set including one or more item identifiers with probability values indicative of a probability that the one or more item identifiers of one or more items were involved in the interaction at the shelf;

determine, based on the weight data, a second set of hypotheses for the interaction, each hypothesis of the second set including:
one or more item identifiers,
a predicted quantity of items for each of the one or more item identifiers, and
probability values indicative of a probability that the hypothesis is true;

combine the first set of hypotheses and the second set of hypotheses using Bayes' rule to generate a third set of hypotheses for the interaction, each hypothesis of the third set including:
one or more item identifiers indicative of one or more items; and
predicted quantities of the one or more items with probability values indicative of a probability the hypothesis is true;

determine, from the third set of hypotheses for the interaction, a first hypothesis having a first highest probability and a second hypothesis having a second highest probability;

determine a first confidence value for the first hypothesis based on a difference between the first highest probability and the second highest probability of the third set of hypotheses;

compare the first confidence value and a first confidence value threshold;

determine the first confidence value is below the first confidence value threshold;

determine, responsive to the data indicative of a change in appearance of the shelf and based on the start frame and the end frame, a fourth set of hypotheses for the interaction, each hypothesis of the fourth set including:

one or more predicted quantities of the one or more items with probability values indicative of a probability that the hypothesis is true;

combine the third set of hypotheses for the interaction and the fourth set of hypotheses for the interaction using Bayes' rule to generate a fifth set of hypotheses for the interaction, each hypothesis of the fifth set including:
one or more item identifiers,
the predicted quantity of items for each of the one or more item identifiers, and
probability values indicative of a probability that the one or more item identifiers and the predicted quantity of items for each of the one or more item identifiers is true;

select one hypothesis of the fifth set of hypotheses as a solution that describes the interaction; and update inventory quantities for the at least one of the first type of item and the second type of item using the solution.

2. The system of claim 1, further comprising computer-executable instructions to:

determine, from the fifth set of hypotheses, a third hypothesis having a first highest probability and a fourth hypothesis having a second highest probability;

determine a second confidence value for the third hypothesis based on a difference between the first highest probability and the second highest probability of the fifth set of hypotheses;

compare the second confidence value and the first confidence value threshold;

determine the second confidence value is at or above the first confidence value threshold; and designate the third hypothesis as the solution.

3. The system of claim 2, further comprising computer-executable instructions to:

determine, based on the solution, interaction data indicative of:
a change in quantity of one or more items resulting from the interaction,
an item identifier indicative of the one or more items involved in the interaction, and
one of the first partitioned area or the second partitioned area at which the one or more items were picked or placed.

4. A system comprising:

a computing device comprising:
a memory, storing computer-executable instructions; and
a hardware processor to execute the computer-executable instructions to:

determine that an interaction has been detected involving one or more items at an inventory location;

in response to determining that the interaction has been detected, identify that weight data and image data describing the interaction are available, wherein the weight data is acquired by a plurality of weight sensors at the inventory location and the image data is acquired by a camera viewing the inventory location;

access the weight data acquired by the plurality of weight sensors at the inventory location;

access the image data acquired by the camera viewing the inventory location;

generate, from the image data, motion data indicative of an occurrence of motion at the inventory location;

determine, from the image data, a start frame acquired before the motion and an end frame acquired after the motion;

determine, based on the image data, a first set of hypotheses for the interaction, each hypothesis in the first set indicative of a probability that a particular item identifier was involved in the interaction;

determine, based on the weight data, a second set of hypotheses for the interaction, each hypothesis in the second set indicative of a probability that a particular quantity of a particular item was involved in the interaction;

determine that a probability value for each of the hypotheses in the first set and second set is below a confidence level threshold;

determine a third set of hypotheses for the interaction by combining at least a portion of the first set of hypotheses for the interaction and at least a portion of the second set of hypotheses for the interaction;

compare a probability value for one or more hypotheses in the third set of hypotheses for the interaction with the confidence level threshold;

determine that one of the one or more hypotheses in the third set of hypotheses has a probability value above the confidence level threshold;

determine that the one of the one or more hypotheses in the third set of hypotheses represents a solution indicative of a quantity of the one or more items that changed at the inventory location; and update inventory quantities for the one or more items at the inventory location based on the solution.

5. The system of claim 4, further comprising computer-executable instructions to:

generate, from the start frame acquired before the occurrence of motion and the end frame acquired after the occurrence of motion, differential data indicative of a change in appearance of the inventory location;

determine, using the start frame and the end frame, a fourth set of hypotheses for the interaction, each hypothesis in the fourth set including a quantity of an item and a probability value indicative of a probability that the quantity of the item was one or more of added to or removed from the inventory location; and wherein the third set of hypotheses for the interaction is further determined using the fourth set of hypotheses.

6. The system of claim 5, further comprising computer-executable instructions to:

count a start number of item tops appearing in the start frame;

count an end number of item tops appearing in the end frame; and determine the quantity of the one or more items that were one or more of added to or removed by subtracting the start number from the end number.

7. The system of claim 4, wherein updating the inventory quantities further comprises computer-executable instructions to:

increase or decrease, based on the solution, data indicative of a quantity on hand of the one or more items at the inventory location.

8. The system of claim 4, further comprising computer-executable instructions to:

add to the third set of hypotheses for the interaction a hypothesis indicative of pick and place of the particular item indicated by the particular item identifier to and from the inventory location with a net change in quantity of zero.

9. The system of claim 4, further comprising computer-executable instructions to:

send a request to acquire the weight data from the plurality of weight sensors at the inventory location and the image data from the camera viewing the inventory location; and acquire the weight data and the image data contemporaneously with one another.

10. The system of claim 4, further comprising computer-executable instructions to:

determine the occurrence of motion at the inventory location based on changes between a plurality of images in the image data;

determine one or more of cessation of motion in the image data or that a maximum wait time has been reached; and wherein the computer-executable instructions to determine the third set of hypotheses for the interaction are responsive to the cessation of motion.

11. The system of claim 4, further comprising computer-executable instructions to:

determine a gradient difference between pixels in consecutive frames of the image data;

based on the gradient difference exceeding a threshold value, determine the occurrence of motion at the inventory location;

determine a group of frames associated with the occurrence of motion; and wherein the computer-executable instructions to determine the first set of hypotheses are responsive to the determination of the occurrence of motion.

12. The system of claim 4, wherein the second set of hypotheses for the interaction is based on a predicted weight distribution across the plurality of weight sensors for the particular quantity of the particular item.

13. The system of claim 4, further comprising computer-executable instructions to determine the weight data using computer-executable instructions to:

access sensor data acquired by the plurality of weight sensors;

determine filtered sensor data from the sensor data using an exponential moving average function;

access a window length indicative of an interval of time;

access a portion of the filtered sensor data having associated time values within a range of time values delineated by the window length;

use a linear regression to fit a straight line to the portion of the filtered sensor data;

determine a slope value of the straight line;

determine, using a cumulative sum (CUSUM) function, change data associated with the slope value, wherein the change data is indicative of the portion of the filtered sensor data being one of stable or unstable;

based on the change data, determine a first stable state of the plurality of weight sensors before an unstable state of the plurality of weight sensors;

based on the change data, determine a second stable state of the plurality of weight sensors after the unstable state;

determine, as first filtered sensor data, the filtered sensor data acquired at a time of the first stable state;

determine, as second filtered sensor data, the filtered sensor data acquired at a time of the second stable state; and store, as the weight data, a difference between the first filtered sensor data and the second filtered sensor data.

14. The system of claim 4, further comprising computer-executable instructions to:
determine one or more probabilities of the third set of hypotheses for the interaction using Bayes' rule.

15. The system of claim 4, the computer-executable instructions to determine the second set of hypotheses further comprising computer-executable instructions to:
determine a measured change in weight at the inventory location;
determine a measured weight distribution of the inventory location;
determine one or more hypotheses for the interaction, each hypothesis including data indicative of:
a predicted quantity of the particular item,
a predicted change in weight, and
a predicted weight distribution; and
determine, as the second set of hypotheses for the interaction, a subset of the one or more hypotheses for the interaction based at least in part on the measured change in weight and the measured weight distribution.

16. A method comprising:
determining, using one or more sensors associated with an inventory location, that an interaction has been detected involving one or more items at the inventory location;
responsive to the determining that the interaction has been detected, accessing non-weight data and weight data describing the interaction from at least one of the one or more sensors;
generating, from the non-weight data, data indicative of an occurrence of motion at the inventory location;
determining, based on the non-weight data, a first set of hypotheses for the interaction, each hypothesis in the first set indicative of a probability that a particular item identifier was involved in the interaction with the one or more items at the inventory location;
determining, based on the weight data, a second set of hypotheses for the interaction, each hypothesis in the second set indicative of a probability that a particular quantity of a particular item was involved in the interaction;
determining a third set of hypotheses for the interaction by combining at least the first set of hypotheses and the second set of hypotheses;
comparing a probability value for one or more hypotheses in the third set of hypotheses for the interaction with a confidence level threshold;
determining that one of the one or more hypotheses in the third set of hypotheses has a probability value above the confidence level threshold;
determining that the one of the one or more hypotheses in the third set of hypotheses represents a solution indicative of a change in quantity of the one or more items at the inventory location; and
updating inventory quantities regarding the one or more items at the inventory location using the solution.

17. The method of claim 16, further comprising:
determining, based on the non-weight data and the weight data, a partitioned area at the inventory location that underwent a change in quantity in the one or more items.

18. The method of claim 16, further comprising:
determining the non-weight data obtained before the occurrence of motion;
determining the non-weight data obtained after the occurrence of motion;
generating data indicative of a change in appearance of the inventory location based on the non-weight data obtained before the occurrence of motion and the non-weight data obtained after the occurrence of motion;
determining, using the non-weight data obtained before the motion and the non-weight data obtained after the motion, a fourth set of hypotheses for the interaction, each hypothesis of the fourth set including a quantity of the particular item and a probability value indicative of a probability that the particular quantity of the particular item was one or more of: added to or removed from the inventory location; and
wherein the determining the third set of hypotheses for the interaction includes the fourth set of hypotheses for the interaction.

19. The method of claim 16, further comprising:
determining a gradient difference between pixels in consecutive frames of the non-weight data;
determining the occurrence of motion at the inventory location based on the gradient difference exceeding a threshold value; and
wherein the determining the first set of hypotheses for the interaction is responsive to the determination of the occurrence of motion.

20. The method of claim 16, further comprising:
determining a measured change in weight at the inventory location;
determining a measured weight distribution of the inventory location;
determining one or more hypotheses for the interaction, each hypothesis including data indicative of:
a predicted quantity of the particular item;
a predicted change in weight; and
a predicted weight distribution; and
determining, as the second set of hypotheses for the interaction, a subset of the one or more hypotheses based at least in part on the measured change in weight and the measured weight distribution.

21. A method comprising:
determining, using one or more sensors associated with an inventory location, that an interaction has been detected involving one or more items at the inventory location;
accessing non-weight data and weight data associated with the interaction from at least one of the one or more sensors;
determining, based the non-weight data, a start frame and an end frame occurring before and after detection of the interaction;
determining, based the non-weight data, a first set of hypotheses for the interaction, each of the hypothesis in the first set indicative of a probability that a particular quantity of a particular item was involved in the interaction;
determining, based on the weight data, a second set of hypotheses for the interaction, each of the hypothesis in the second set indicative of a probability that a particular quantity of a particular item was involved in the interaction;
generating a third set of hypotheses by combining at least the first set of hypotheses and the second set of hypotheses; and
comparing a probability value of one or more of the hypothesis in the third set of hypotheses with a confidence level threshold.

* * * * *